(12) United States Patent
Letor et al.

(10) Patent No.: US 8,169,178 B2
(45) Date of Patent: May 1, 2012

(54) DETECTION OF THE ANGULAR POSITION OF THE ROTOR OF A BRUSH MOTOR WITHOUT USING SENSORS

(75) Inventors: Romeo Letor, Mascalucia (IT); Francesco Giuffré, Messina (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 293 days.

(21) Appl. No.: 12/648,790

(22) Filed: Dec. 29, 2009

(65) Prior Publication Data

US 2010/0171457 A1 Jul. 8, 2010

(30) Foreign Application Priority Data

Dec. 30, 2008 (IT) ................................ VA2008A0070

(51) Int. Cl.
*H02P 7/00* (2006.01)
(52) U.S. Cl. ........ 318/490; 318/603; 318/600; 318/632; 318/652; 318/286
(58) Field of Classification Search .................. 318/490, 318/603, 600, 632, 652, 286
See application file for complete search history.

(56) References Cited

U.S. PATENT DOCUMENTS

| 6,498,449 | B1 * | 12/2002 | Chen et al. ..................... 318/434 |
| 6,653,829 | B1 * | 11/2003 | Henry et al. .............. 324/207.21 |
| 6,768,282 | B2 | 7/2004 | Lutter et al. ................... 318/603 |
| 6,839,653 | B2 | 1/2005 | Gerlach ........................ 702/151 |
| 6,859,030 | B2 | 2/2005 | Otte ............................. 324/166 |
| 7,079,964 | B2 | 7/2006 | Gerlach .......................... 702/76 |
| 2007/0108969 | A1 | 5/2007 | Kurimoto et al. ......... 324/207.25 |
| 2007/0194737 | A1 | 8/2007 | Pino et al. ..................... 318/466 |

FOREIGN PATENT DOCUMENTS

| DE | 19729238 | 8/1998 |
| EP | 0689054 | 12/1995 |
| EP | 0890841 | 1/1999 |
| EP | 1453172 | 9/2004 |

* cited by examiner

*Primary Examiner* — Bentsu Ro
*Assistant Examiner* — David Luo
(74) *Attorney, Agent, or Firm* — Allen, Dyer, Doppelt, Milbrath & Gilchrist, P.A.

(57) ABSTRACT

A method of detecting an angular position of a rotor of a motor includes detecting switching ripple peaks and armature current disturbance peaks using a peak detector configured to generate a square wave having edges coinciding with detected peaks. The method further includes filtering the square wave in a time domain by generating an integration ramp, toward a set value, of an estimated ripple frequency for an interval of time based on the estimated ripple frequency. An enablement range is established to reset the integration ramp by setting a threshold below and above the set value and a time window centered on an end time of each period of the estimated ripple frequency. The method further includes resetting the integration ramp, and updating the estimated ripple frequency based upon a period determined by a time of the resetting, if an edge of the square wave is within the time window.

17 Claims, 28 Drawing Sheets

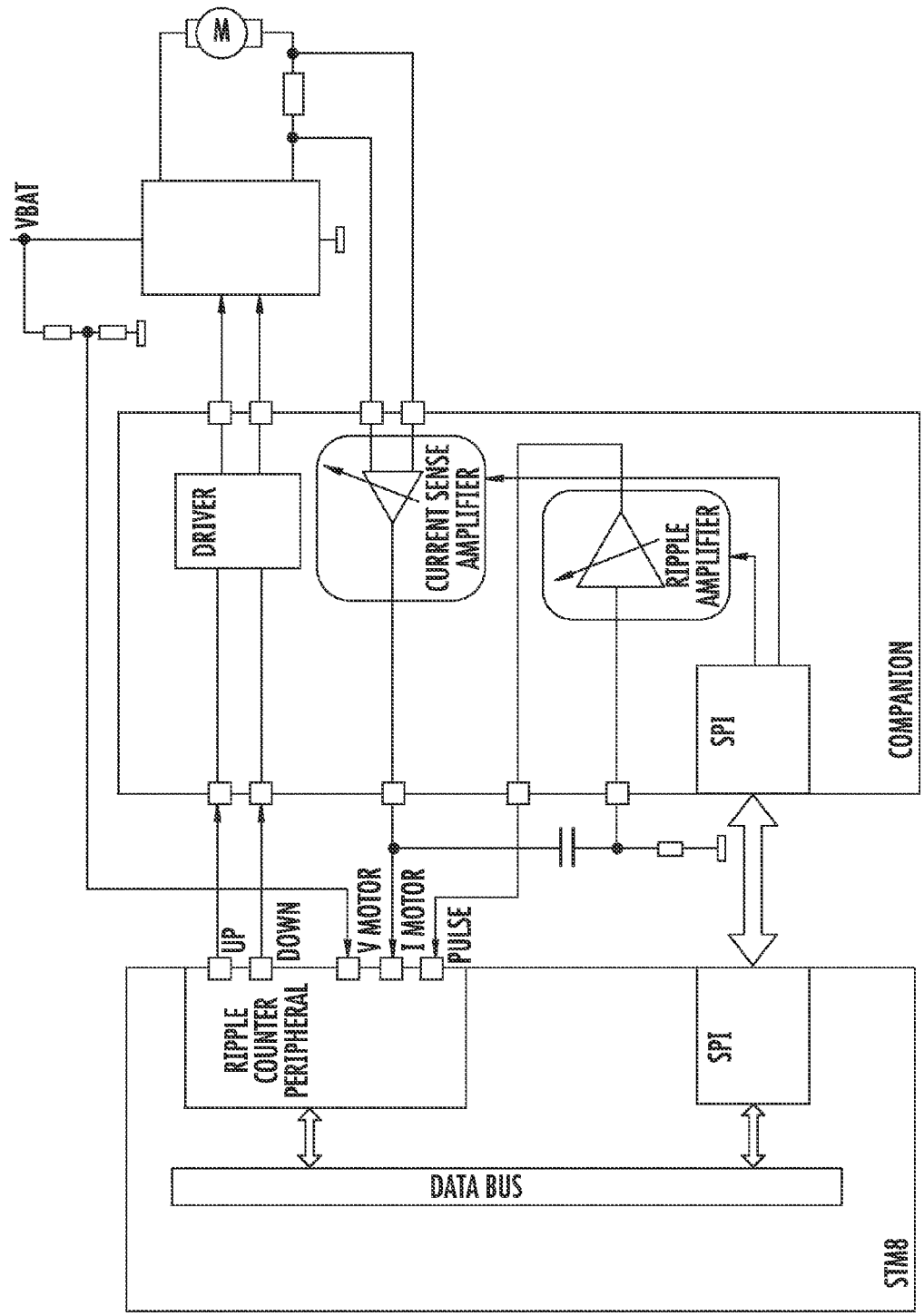

DETECTION OF THE ANGULAR POSITION OF THE ROTOR OF A BRUSH MOTOR WITHOUT USING SENSORS

FIELD OF THE INVENTION

This disclosure relates, in general, to control techniques of DC brush motors and, more particularly, to a method and related implementing circuits for detecting the angular position of the rotor relative to the stator, and thus the speed of rotation of a motor, without using sensors.

BACKGROUND OF THE INVENTION

Control systems of brush DC motors use information about the current rotation speed of the motor.

Commonly used detection methods of the rotation speed are based on the use of Hall sensors that count the number of passages of a magnet mounted on the shaft, or of an encoder mounted on the shaft that establishes the angular position of the shaft. These systems use 3 connection lines for each sensor mounted on the motor, and thus additional cabling besides the cabling to power the motor.

Alternative methods for sensing the angular position of the rotor without using sensors, based on the analysis of the armature current for detecting the ripple induced by brush switchings, have been developed. FIG. 1 illustrates the detection principle. The origin of the switching ripple on the armature current of a DC motor is well known to a skilled person and it is considered superfluous to discuss it in this document.

A technical challenge exists in counting the peaks of the armature current, the waveform of which, besides the ripple due to the switching of the brushes, has numerous and different irregularities because of wear and tear of the motor, physical phenomena tied to the functioning of the motor, and disturbances injected in the power line. In practice, the noise that is typically present has a frequency and an amplitude spectra similar to that of the useful signal. Moreover, the strong variability of the parameters that may cause spurious effects on the armature current signal is such to generate ripple (peaks) also when the useful signal is momentarily missing, and this increases relevantly criticalness of the control.

Some of the main causes of disturbances that an appropriate filter would be capable of discriminating include that the rotor magnetic field generates a BEMF outphased in respect to the BEMF due to the variation of the stator magnetic field, as illustrated in FIG. 2. This phenomenon generates a double waveform during switchings of the brushes, as illustrated in the diagrams A) and B) of FIG. 3, relative to two functioning conditions of a DC motor for car window movements. The Fourier analysis illustrated in FIG. 4 shows that the main component of the ripple frequency may be totally missing. From this it is possible to infer that a filter based on frequency analysis could be inadequate.

Another cause may be that the current signal is missing for a significant time interval. Typically this phenomenon occurs during the switching of the driving relays that may last longer than 10 ms, as shown in FIG. 5. During this time, up to five peaks may be lost, corresponding to more than half a turn of the motor.

Still another cause may be that the enabling of the motor generates a double peak due to the start-up current, as shown in FIG. 6.

A further cause may be that current peaks not due to switching of the brushes are generated by noise injected through the supply line. If the frequency of the motor is comparable with the switching frequency of the brushes, peaks generated by noise could be detected and generate a false counting.

Yet another cause may be that brush motors for the car industry have generally a reduced number of brushes and thus the counting must be precise for satisfying the required standards of automotive systems. It is thus helpful to reduce the counting error due to the reduced number of brush switchings, with a system adapted to assess intermediate positions of the rotor between two brush switchings. Moreover, the fact that the intermediate position is not known may generate counting errors because it is difficult to synchronize the filter signal with the signal to be analyzed from the first pulse.

Among the relevant prior art documents about processing of the armature current signal in order to minimize the estimation error of the angular position and the rotation speed of the motor, the following may be mentioned:

EP-A-0 890 841-B1 (TEMIC) compares the state equation of the motor for estimating the ripple frequency and compares the measured ripple frequency of the current with the estimated frequency.

EP-A-0 689 054-B1 (BOSCH) discloses a totally analog circuit with amplifier of a current signal, analog filter that carries out a phase shift, filter and comparator that "squares" the ripple deleting noise.

U.S. Pat. No. 6,859,030 (KOSTAL) discloses the detection of the ripple during a brake phase for estimating the shift while braking.

U.S. Pat. No. 6,768,282 (KOSTAL) discloses the step of comparing the time between two peaks with an estimated time and thus delete a peak if the difference surpasses a certain threshold.

U.S. Pat. No. 7,079,964 (KOSTAL), discloses a spectral analysis of the current signal and of the applied voltage signal. The comparison between the two spectral analysis allows to discriminate frequencies introduced by the current ripple of the motor from the frequency due to noise on the supply line.

U.S. Pat. No. 6,839,653 (KOSTAL) discloses the Fourier analysis of the current signal for discriminating frequencies due to the current ripple from frequencies due to noise.

EP-A-1 453 172-A1 (LEAR) discloses the analysis of the motor current and the use of the current ripple to detect the rotation of the motor shaft. The contemplated filters are relatively complex and are not simple to be realized.

SUMMARY OF THE INVENTION

The method of the present disclosure is based on a filtering action in the time domain that is self-synchronized to the signal to be analyzed, in other words to the switching ripple signal, by detecting its undulation in real time without introducing any delay. In practice the filter is intrinsically capable of transforming the discrete function that expresses the angular position of the rotor (brushes) in a continuous function.

A peak detector generates a square wave pulse signal with leading edges coincident with each switching ripple peak and with peaks of other disturbances present on the armature current signal of the motor. The pulse signal is filtered in the time domain for discriminating ripple peaks from peaks of disturbances uncorrelated to the switching frequency.

The method includes generating integration ramps of the current estimated value of the ripple frequency toward a unitary value, for a time interval that theoretically corresponds to the period of real frequency. An enabling range is established at the reset of the integration ramp of a certain threshold value plus and minus the unitary integration value, and thus a corresponding time window centered on the end instant of the period of the current estimated value of the ripple frequency. A leading edge of the square wave pulse signal, due to the ripple, is validated as long as it falls inside said time window. The method further includes resetting the integration ramp and updating the value of the ripple frequency to a period as determined by the reset instant.

Should a leading edge falling in said time window not be validated, the integration is continued up to reaching the plus threshold beyond the unitary value. As a consequence, the integration ramp is reset and the estimated value of the frequency is reduced to a period as determined by the reset instant.

The method and numerous improvements of the method, as well as the related implementing circuit diagrams, will be more easily recognized through detailed descriptions of several exemplary embodiments of and ways of practicing the invention, referring to the attached drawings, being understood that these detailed descriptions and illustrations of preferred embodiments are given only for exemplification purposes and do not limit the claimed scope of protection defined in the annexed claims.

BRIEF DESCRIPTION OF THE DRAWINGS

FIG. 28 is another possible architecture subdivided into the analog device and the digital device, wherein the ripple is separated by the DC component and amplified to an amplitude compatible to AD conversion, according to the present invention.

DETAILED DESCRIPTION OF THE PREFERRED EMBODIMENTS

The ensuing description illustrates the characteristics of the method and of effective circuit architectures capable of implementing it, without describing details of other functional components besides the details strictly necessary to describe the connections, of the whole control system of the motor that exploits the information of the angular position of the rotor obtained according to the novel method. The components are assumed to be of any of the ordinary types of the numerous components that are commonly used.

Figure 1:
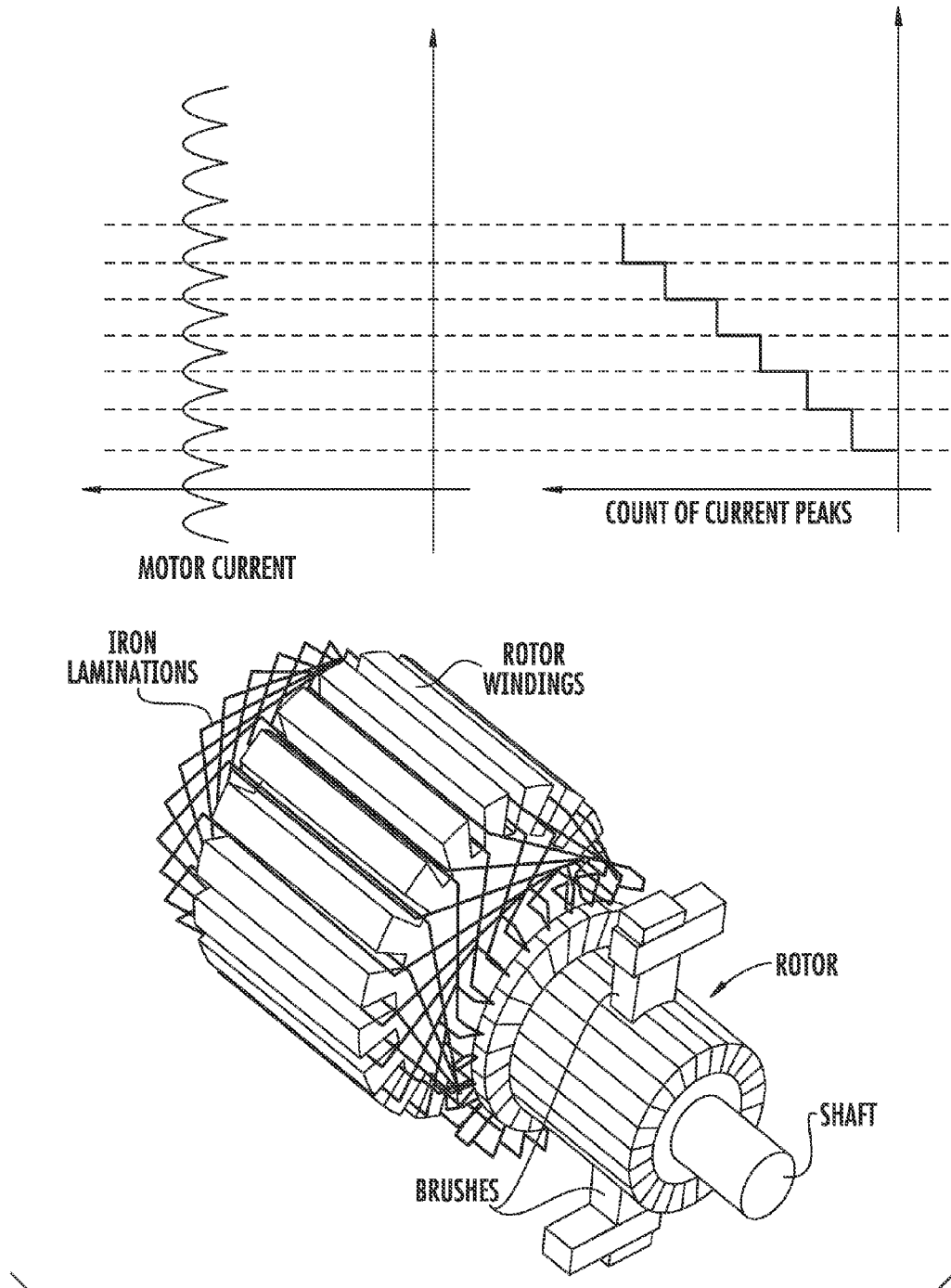
FIG. 1 illustrates the principle of detection of the rotation angle from the switching ripple, according to the prior art.
Figure 2:
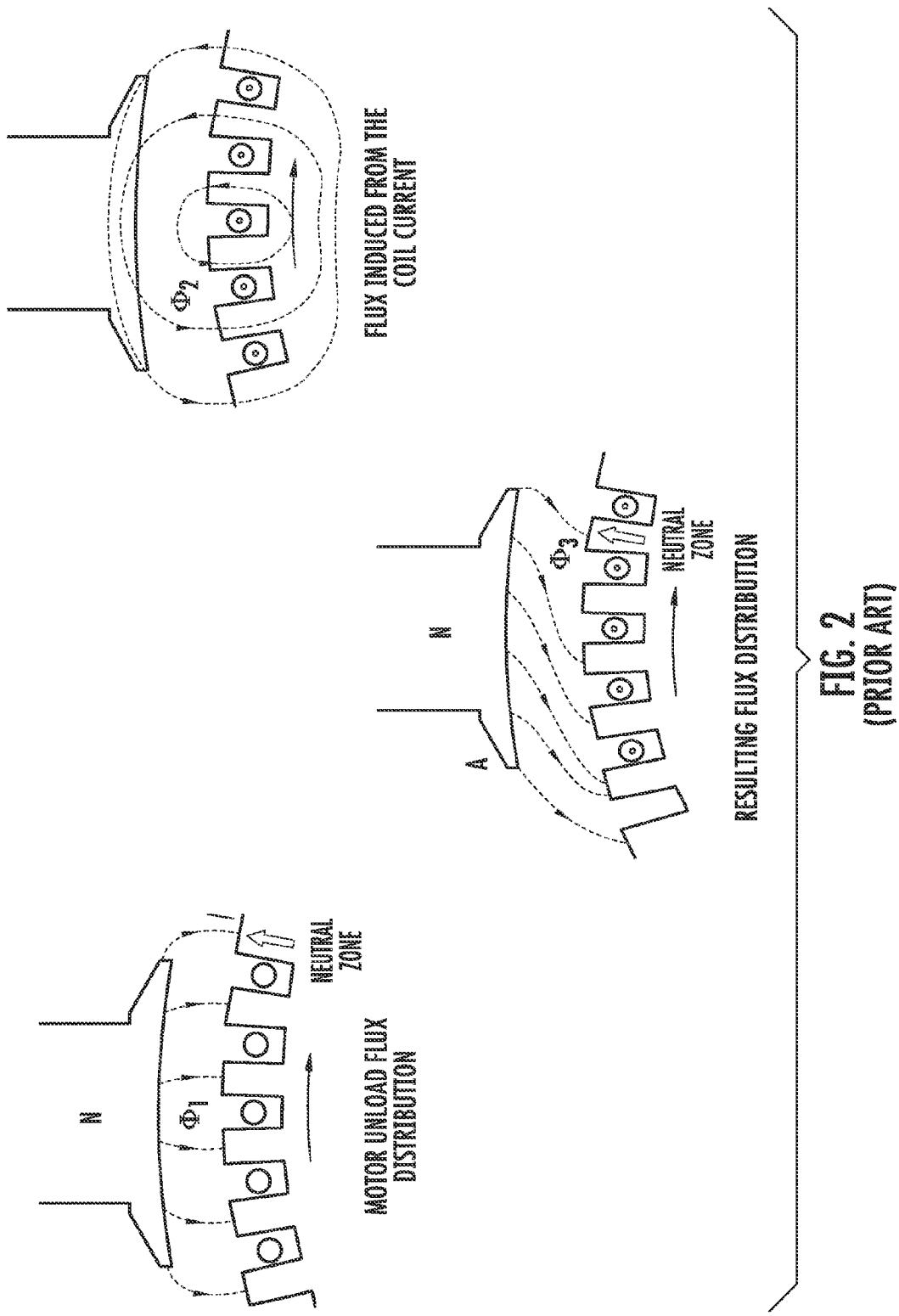
FIG. 2 illustrates how the rotor magnetic field generates a BEMF outphased from the BEMF due to the variation of a stator magnetic field, according to the prior art.
Figure 3A:
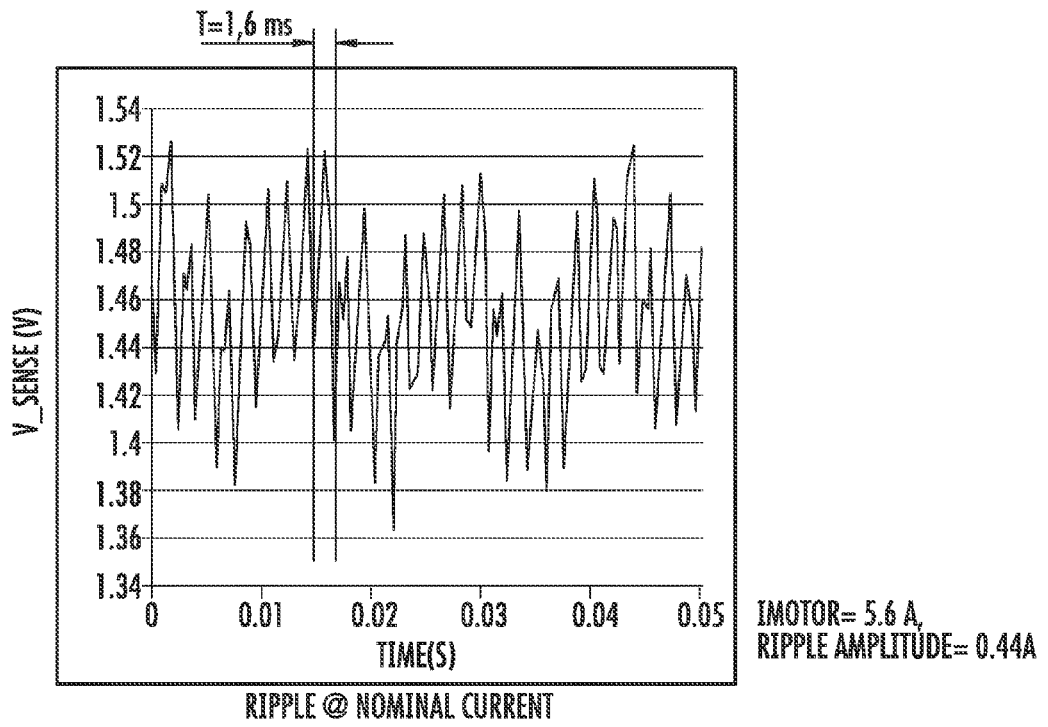
FIGS. 3A and 3B illustrate how a double undulation may occur during brushes switching in different functioning conditions, according to the prior art.
Figure 3B:
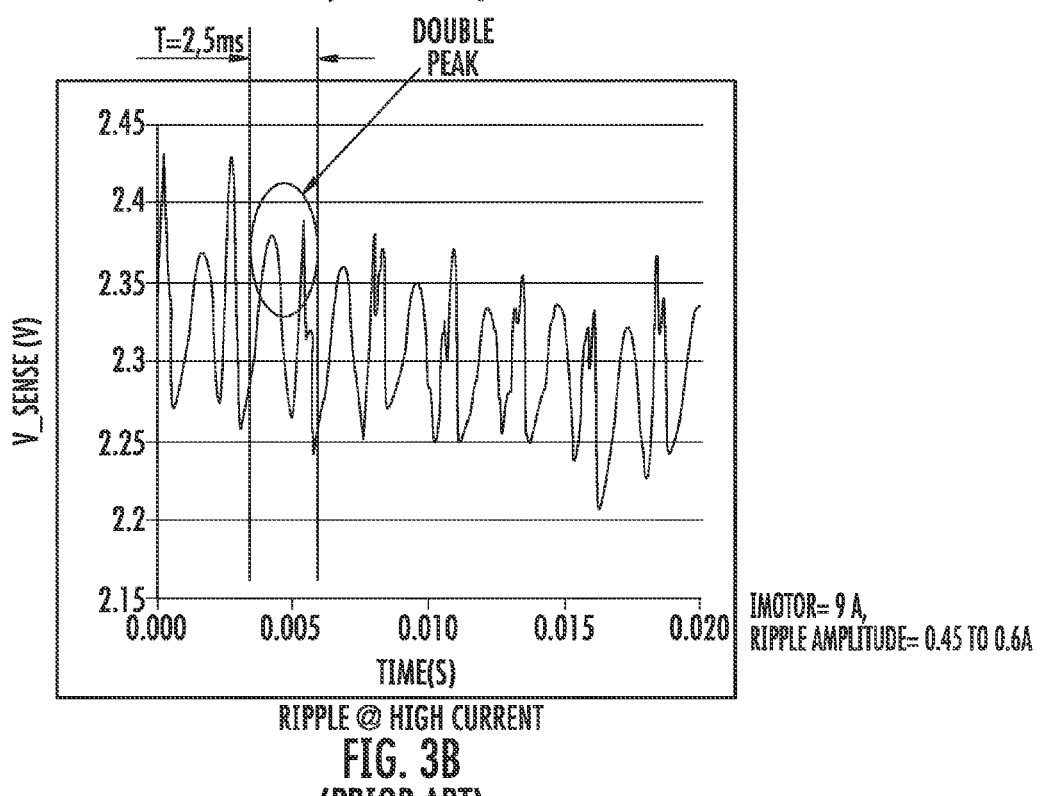
Figure 4:
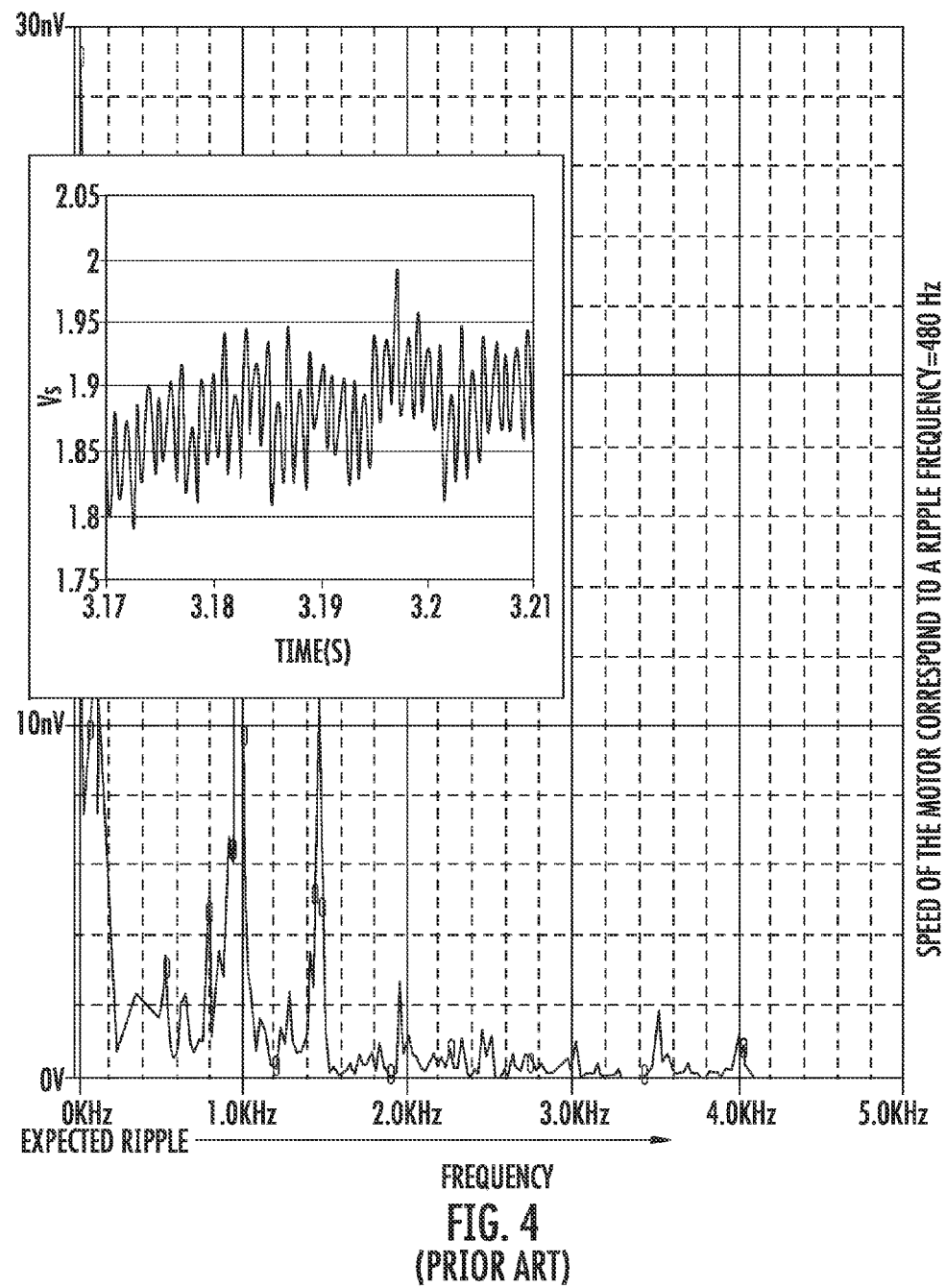
FIG. 4 shows how, the main component of the ripple frequency may be totally absent from a Fourier analysis, according to the prior art.
Figure 5:
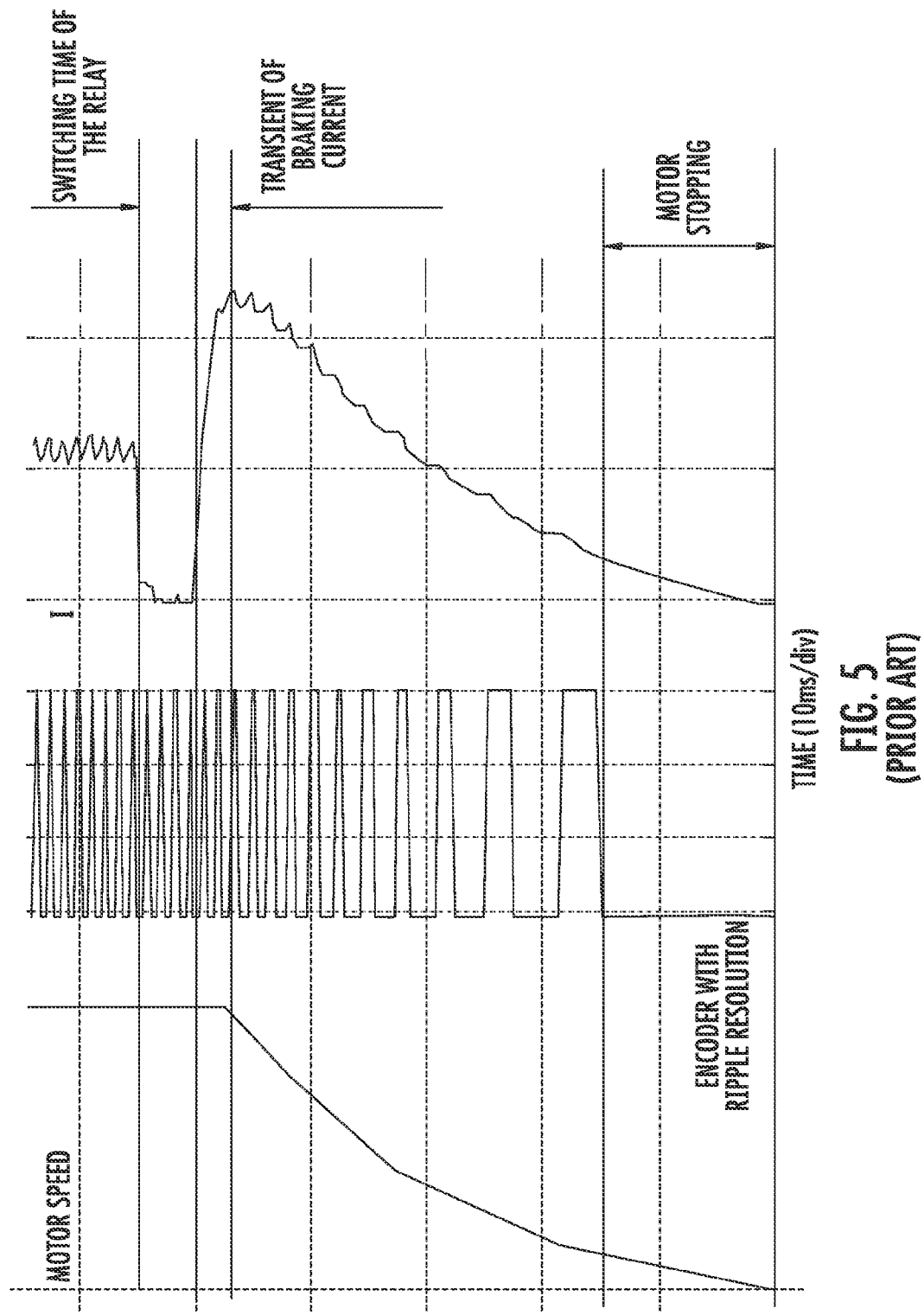
FIG. 5 illustrates how, during the switching of the driving relays, the current signal may lack for a significant time interval, according to the prior art.
Figure 6:
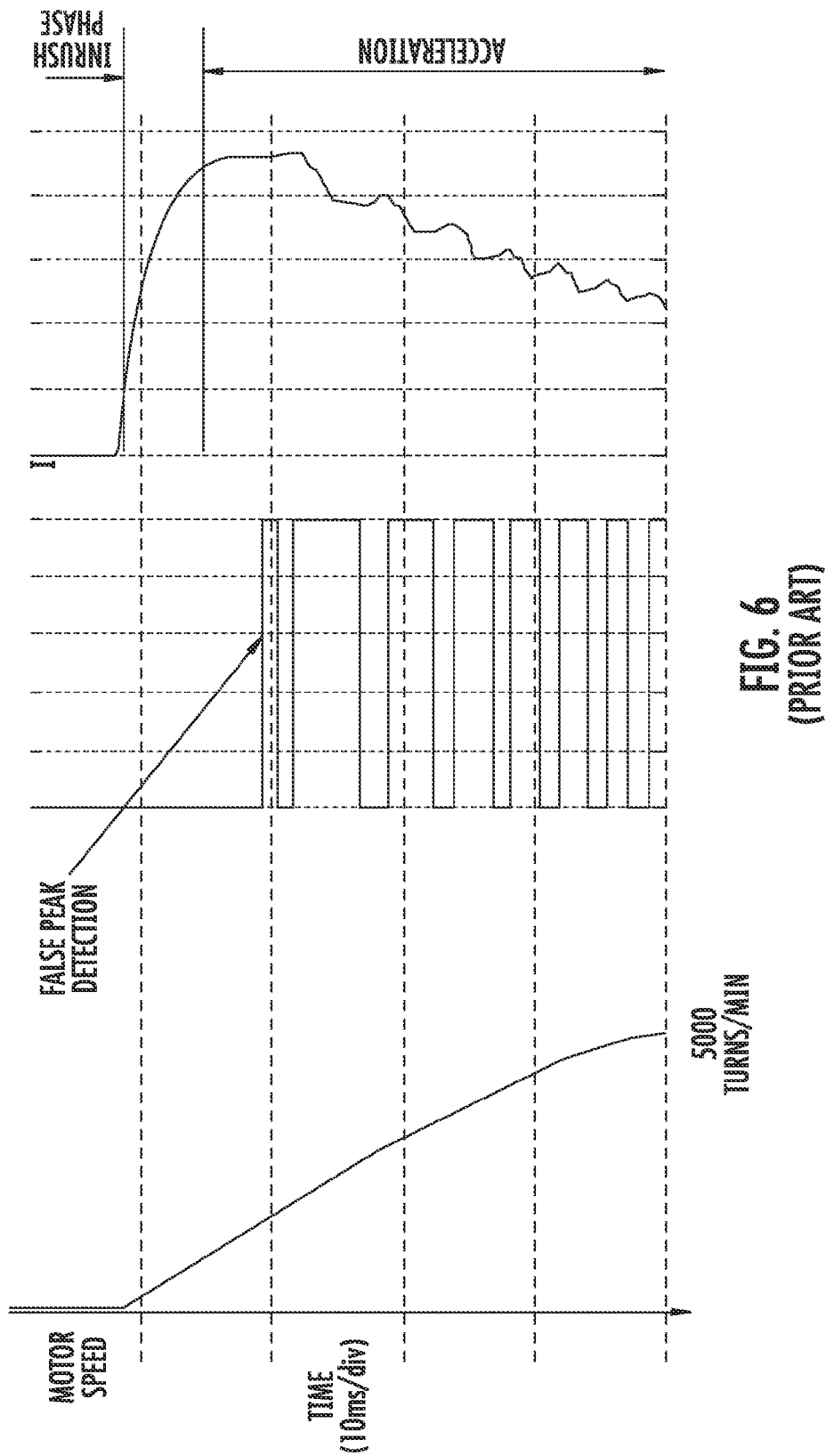
FIG. 6 shows that the activation of the motor may generate a double peak due to the start-up current, according to the prior art.
Figure 7:
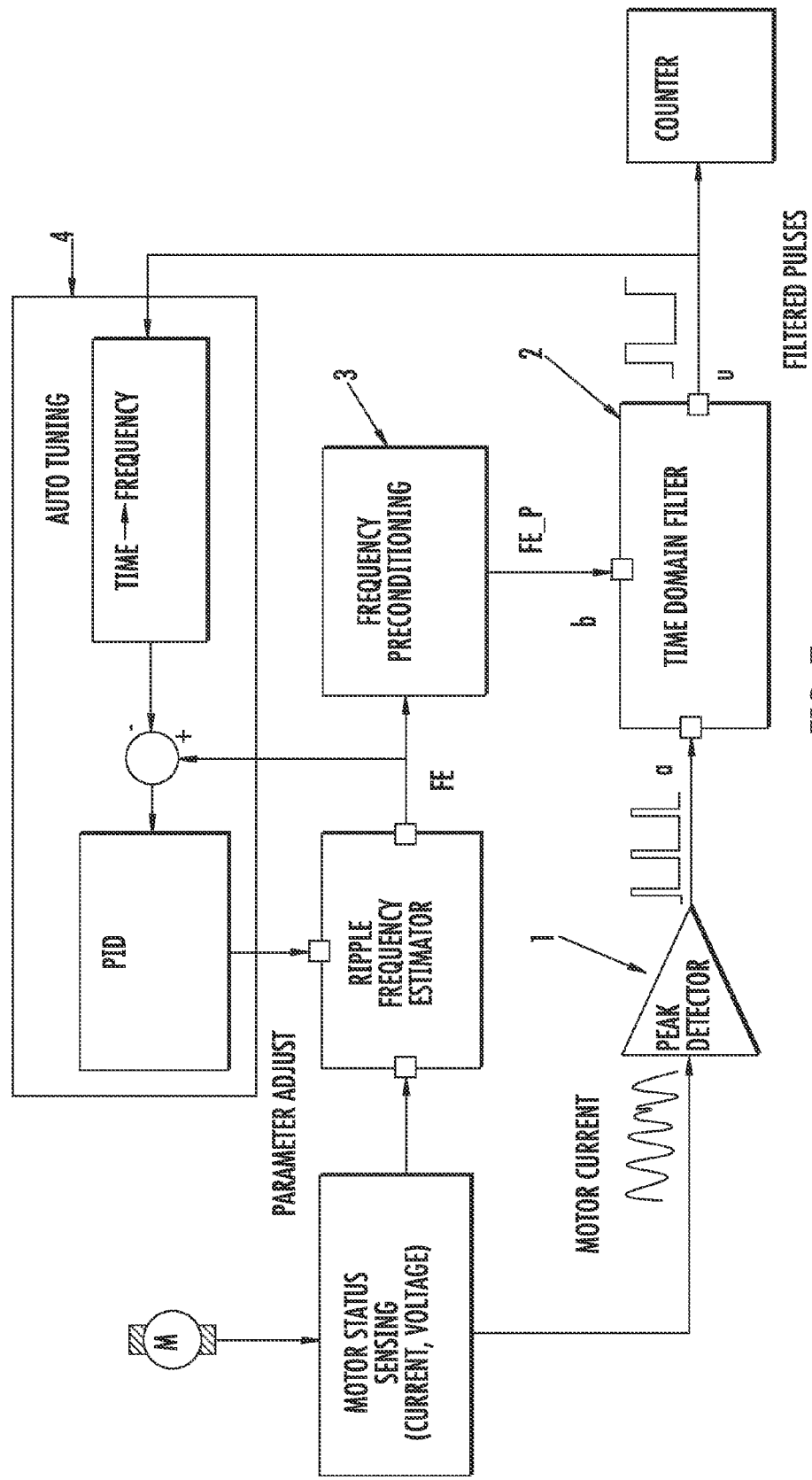
FIG. 7 is a basic block diagram of a first embodiment of the present invention.

FIG. 7 is a basic block diagram of a first embodiment, wherein the functional blocks that implement the novel method: PEAK DETECTOR, TIME DOMAIN FILTER, TIME>>FREQUENCY, PID, FREQUENCY PRE-CONDITIONING, are highlighted on a gray background.

Figure 8:
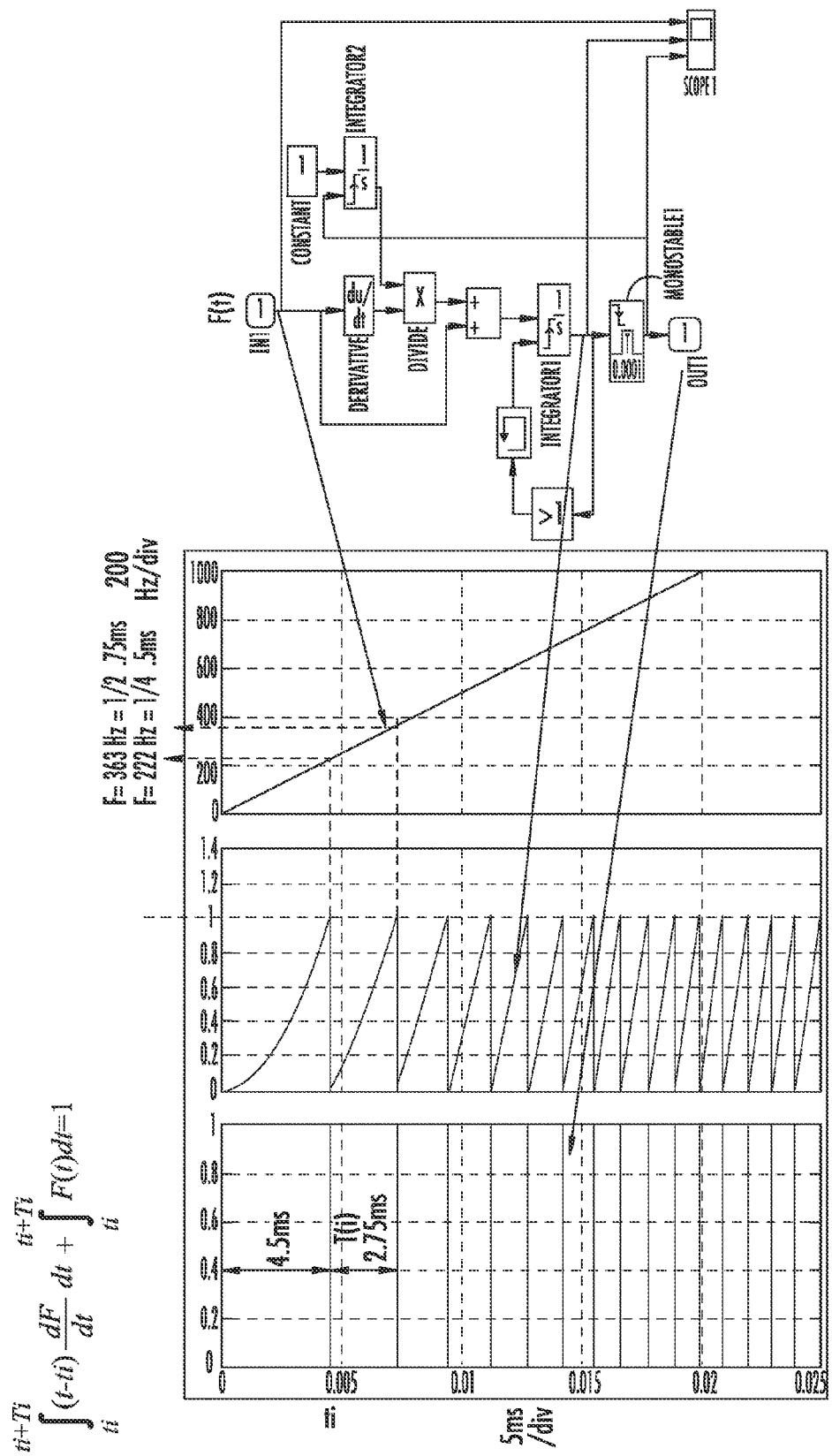
FIG. 8 is a mathematical description of the block TIME DOMAIN FILTER with related circuit diagram and characteristic, relative to a practical embodiment of the present invention.

FIG. 8 is a mathematical description of the block TIME DOMAIN FILTER with relative circuit scheme and diagram, relative to a practical functioning example.

Figure 9:
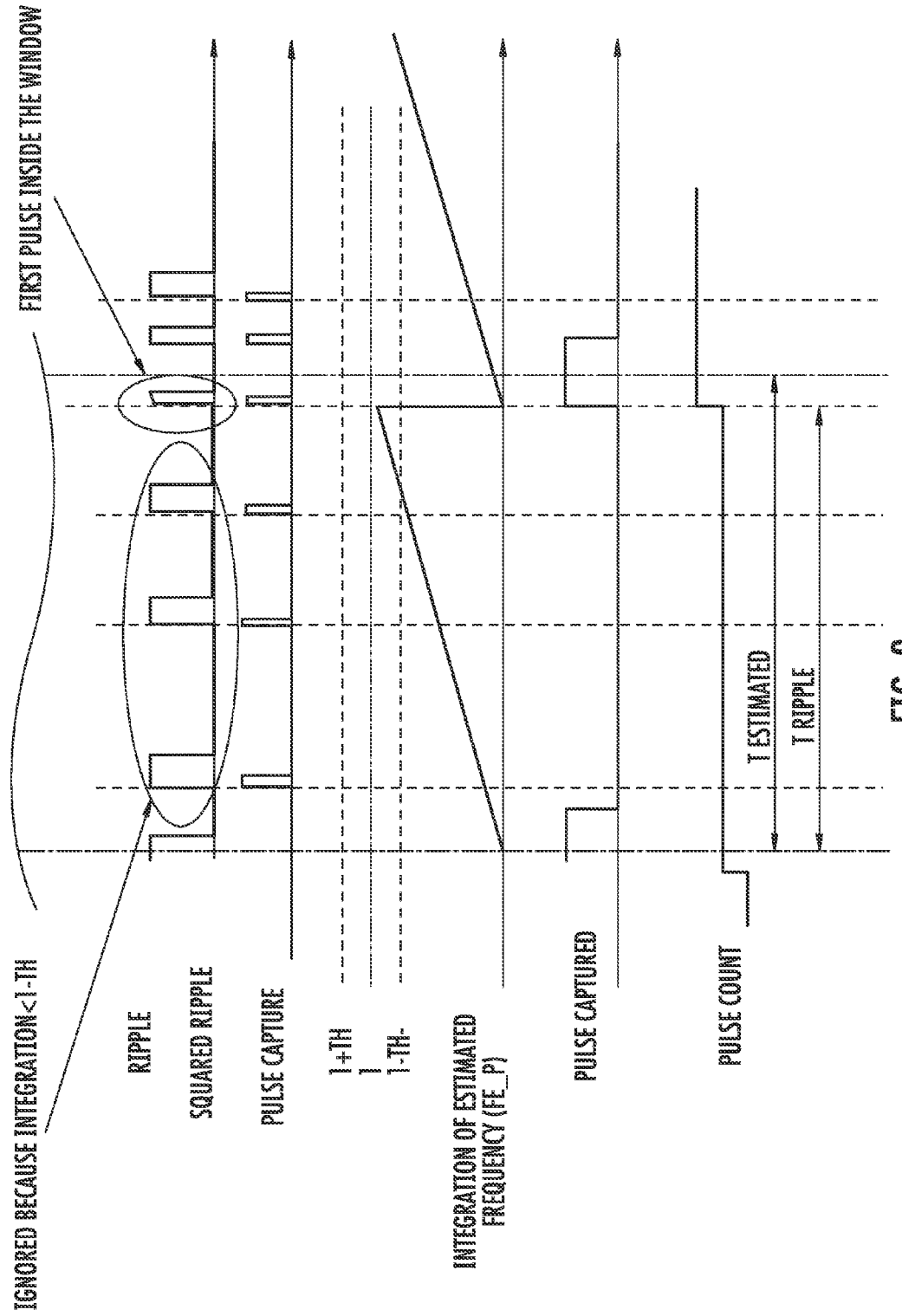
FIG. 9 is a graphical description of the functioning of the block TIME DOMAIN FILTER in discriminating and validating pulses of the square wave pulse signal generated by the peak detector of the block diagram of FIG. 7.

FIG. 9 is a graph description of the functioning of the block TIME DOMAIN FILTER in discriminating and validating pulses of the square wave pulse signal generated by the block PEAK DETECTOR of FIG. 7.

Figure 10:
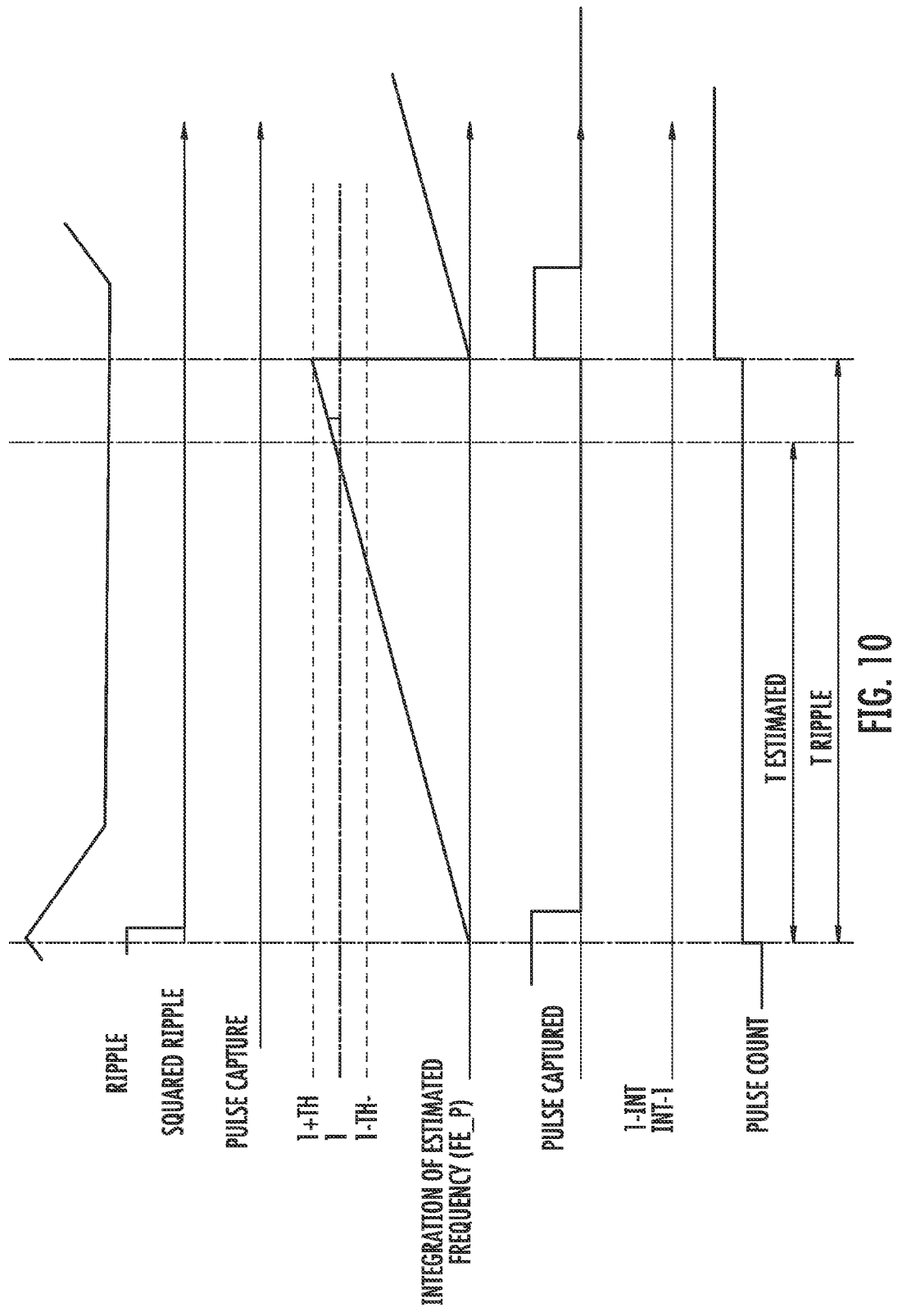
FIG. 10 is a graphical description of the functioning of the block TIME DOMAIN FILTER when a time-out condition (missed validation of a pulse) occurs and how the missed validation is restored, according to the present invention.

FIG. 10 is a graphical description of the functioning of the block TIME DOMAIN FILTER when a time-out condition is verified (missed validation of a pulse) and how, in this case, the missed validation is restored, in practice by reducing the currently estimated value of the ripple frequency (rotation speed) by a quantity appropriate to correspond to the increased period of the time half-window for validating pulses.

Figure 11:
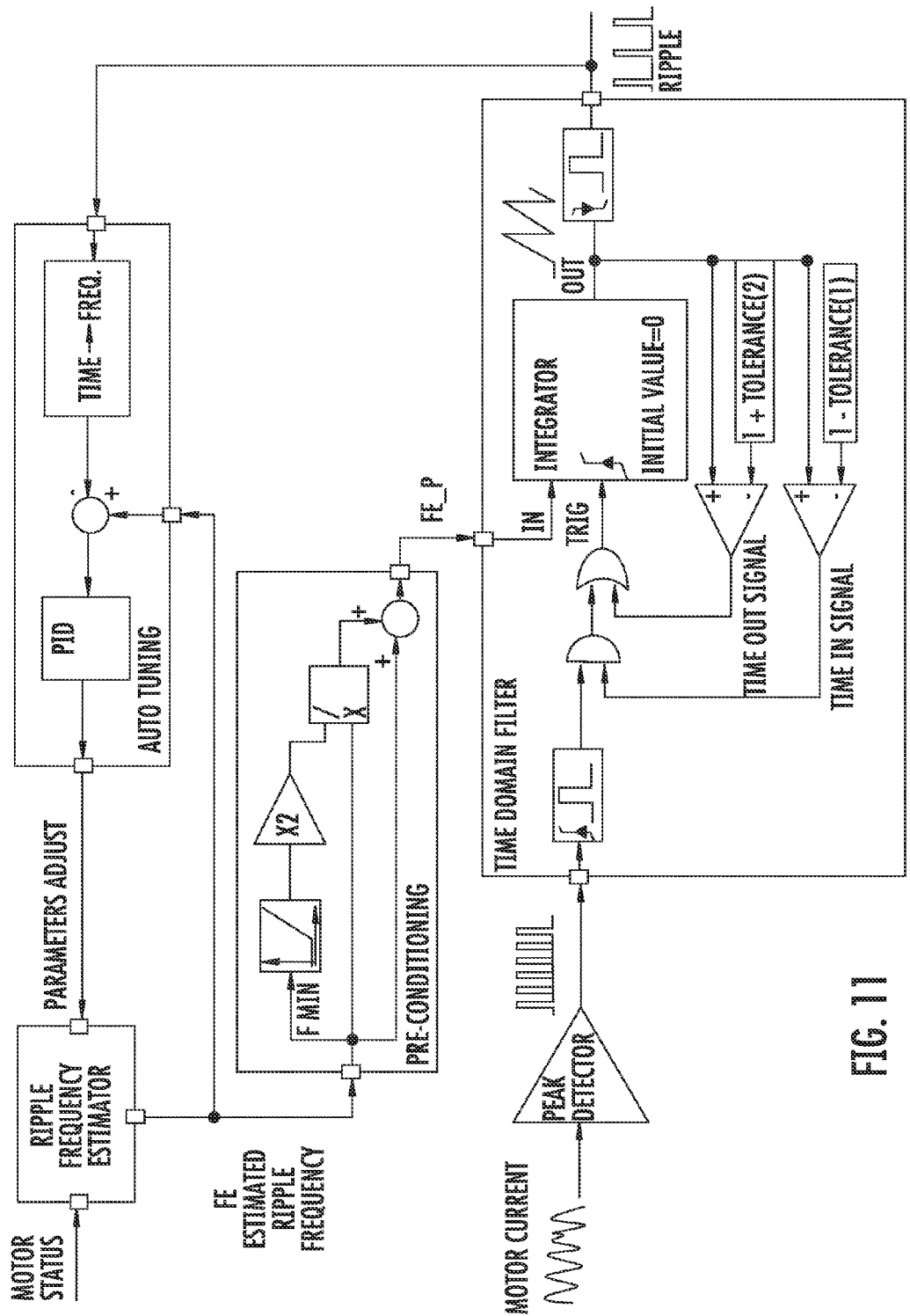
FIG. 11 depicts circuit diagrams of the main blocks of FIG. 7.

FIG. 11 depicts circuit details of the main blocks of the diagram of FIG. 7 according to a first embodiment.

The peak detector PEAK_DETECTOR generates a square wave pulse signal with leading edges coinciding with each peak of switching ripple and of other disturbances on the current armature signal MOTOR_CURRENT of the motor. The pulse signal is filtered in a time domain by the block TIME_DOMAIN_FILTER for discriminating ripple peaks from disturbances considered uncorrelated with the value FE_P processed by the block FREQUENCY_PRE-CONDI-TIONING, depending on the current estimated switching frequency FE. The estimated value of the switching frequency FE is constantly updated depending on the instant in which a pulse is validated within the validation time window centered on the end instant of the period T of the current estimated frequency FE.

The self synchronization block AUTO_TUNING, depending on the filtered ripple frequency, updates the estimation parameters of the frequency and thus the system allows reduction of the effects due to variations of the motor temperature and/or to wear and tear of the motor.

The method includes the step of generating integration ramps (toward the unitary value) of the current estimated value of the ripple frequency for a time interval corresponding to the frequency period. This may be done through the following equation:

$$\int_{ti}^{ti+Ti} (t-ti) \frac{dF}{dt} dt + \int_{ti}^{ti+Ti} F(t) dt = 1$$

for example in the technique illustrated in FIG. 8 where F is the estimated frequency of the ripple pulse, thus if the estimation corresponds to the true integral from the beginning to the end of a cycle or period of the frequency F, it attains the unitary value.

By establishing a first acceptable tolerance range in the estimation of the frequency, it is possible to define a time window centered on the end instant of the estimated enabling period of the reset of the integration ramp. This may be done by fixing a certain threshold value (Δ) smaller than one or negative (1−Δ) and larger than one or positive (1+Δ) of the amplitude of the integration ramp, within the bounds of which the reset of the integration ramp is enabled by a leading edge, that is validated as pertaining to the ripple. The reset instant is the information used for updating the estimated value of the ripple frequency to the period established at the reset instant.

With respect to the exact calculation of the integral, it is possible to simplify significantly the procedure by executing instead the following pre-conditioning operation of the current estimated value of the ripple frequency FE:

$$FE\_P = FE + (dFE/dt)/(2 \times FE)$$

wherein FE=FE (if FE>FEmin) FE=FEmin (if FE<FEmin), and wherein FEmin is the minimum expected value of the ripple frequency. This produces a pre-conditioned value FE_P of the estimated ripple frequency to be integrated during the next (ripple) period.

The above described method is graphically illustrated in FIG. 9 wherein the threshold value Δ=Th. FIG. 10 illustrates graphically a case of missed validation of a leading edge in the time window. When this occurs, the integration may be left proceed as until the amplitude reaches the threshold larger than one 1+Th, and thus the integration ramp is reset and the current estimated value of the frequency reduced to the period determined by the reset instant, that is by the leading edge of a pulse Pulse_captured that is (re)constructed ad hoc to represent in this occasion the captured reset pulse.

According to an embodiment, the above described and illustrated method may be implemented with the various functional blocks highlighted in FIG. 11, that depicts, in a perfectly legible way for any skilled person, the circuit details of the different blocks, because it uses symbols and captions that clarify the nature of the components and of the parameters.

According to a refinement of the method, it is possible to ensure a perfect synchronism of the filter when the motor is restarted after having been stopped, even at the first captured pulse.

The method is indeed capable of transforming the detection system from a system with a finite number of positions per each turn, in a continuous system. In practice, the value of the integral, that is the amplitude of the ramp, indicates the position of the rotor between two switchings. This characteristic allows to restart the integration (the ramp) from the value corresponding to the angular position assumed by the rotor when it had stopped, so the filter keeps the synchronism.

Figure 12:
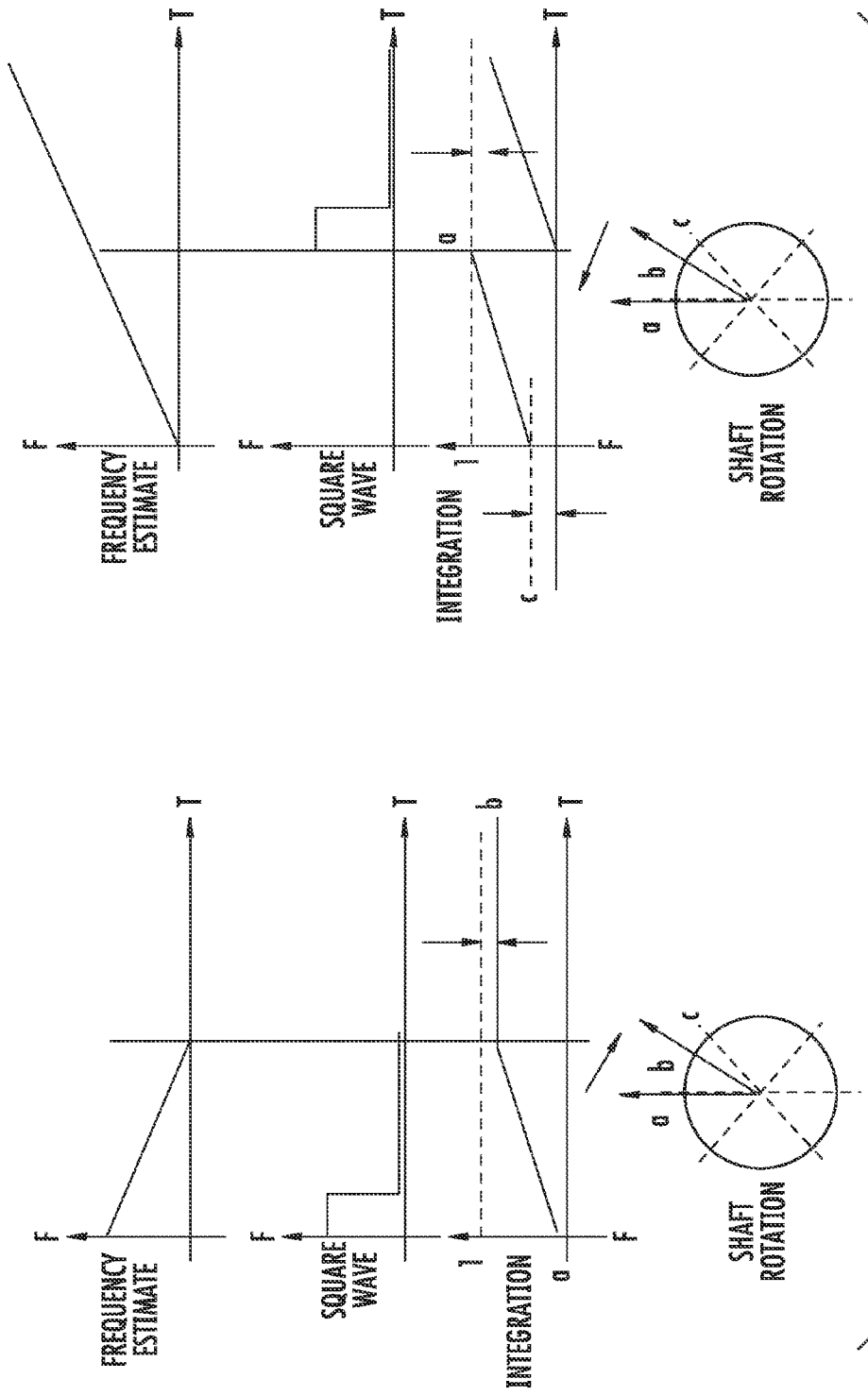
FIG. 12 illustrates graphically how the method may keep synchronism in case of stop-and-go of the motor, according to the present invention.

FIG. 12 illustrates graphically what has been described above and how the method could keep synchronism in case of stop and go of the motor. When the motor is arrested, the rotor will stop in a position that is generally intermediate between the two reference points identified by the peaks of the switching ripple. While the frequency nullifies, the integration value calculates in a continuous fashion such an intermediate position. The value of the integral when the rotor stops allows estimation of the distance from the first cycle of the undulation of the switching ripple at the restart of the motor, thus allowing integration from a value that corresponds to the intermediate point between the two references in which the rotor was when it stopped.

Figure 13:
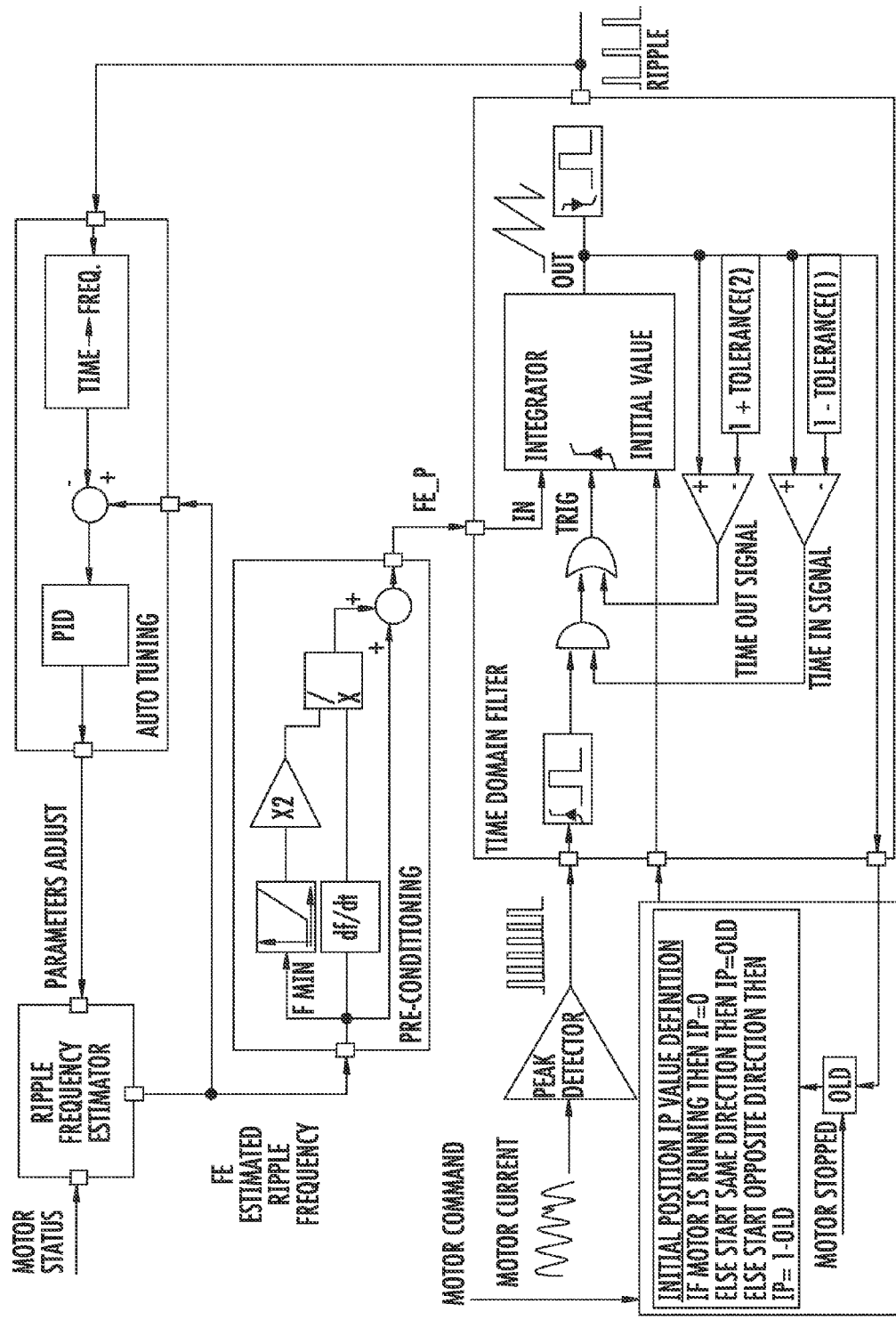
FIG. 13 illustrates a simple integration to the circuit diagrams of FIG. 11 for keeping synchrony in case of stop-and-go of the motor.

FIG. 13 shows the simple integration to the implementing circuit of FIG. 11 that is used for ensuring that the synchronism be kept in case of stop and go. In practice it is sufficient to have a storage block OLD of the value reached by the integration when the rotor stopped and a simple logic adapted to provide as initial value of the integration at the restart instant, instead of the null value, a value that corresponds to the angular position given by the value stored when the rotor stopped.

Figure 14:
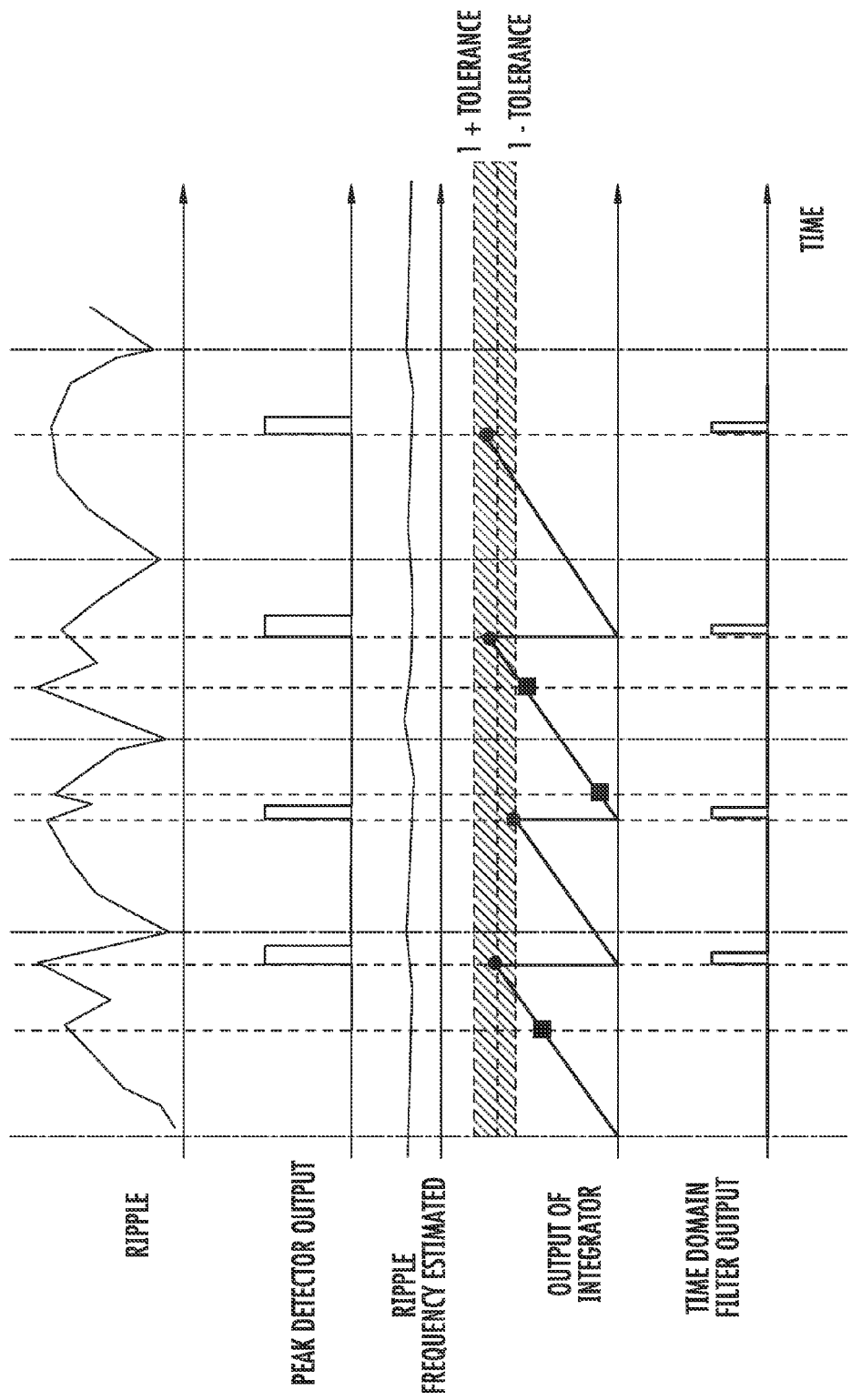
FIG. 14 is a graphical representation of the ability of the filter in the time domain to delete double peaks, according to the present invention.

FIG. 14 is a graph of the ability of the filter in the time domain to delete double peaks that may occur on the armature current signal, as discussed above.

Figure 15:
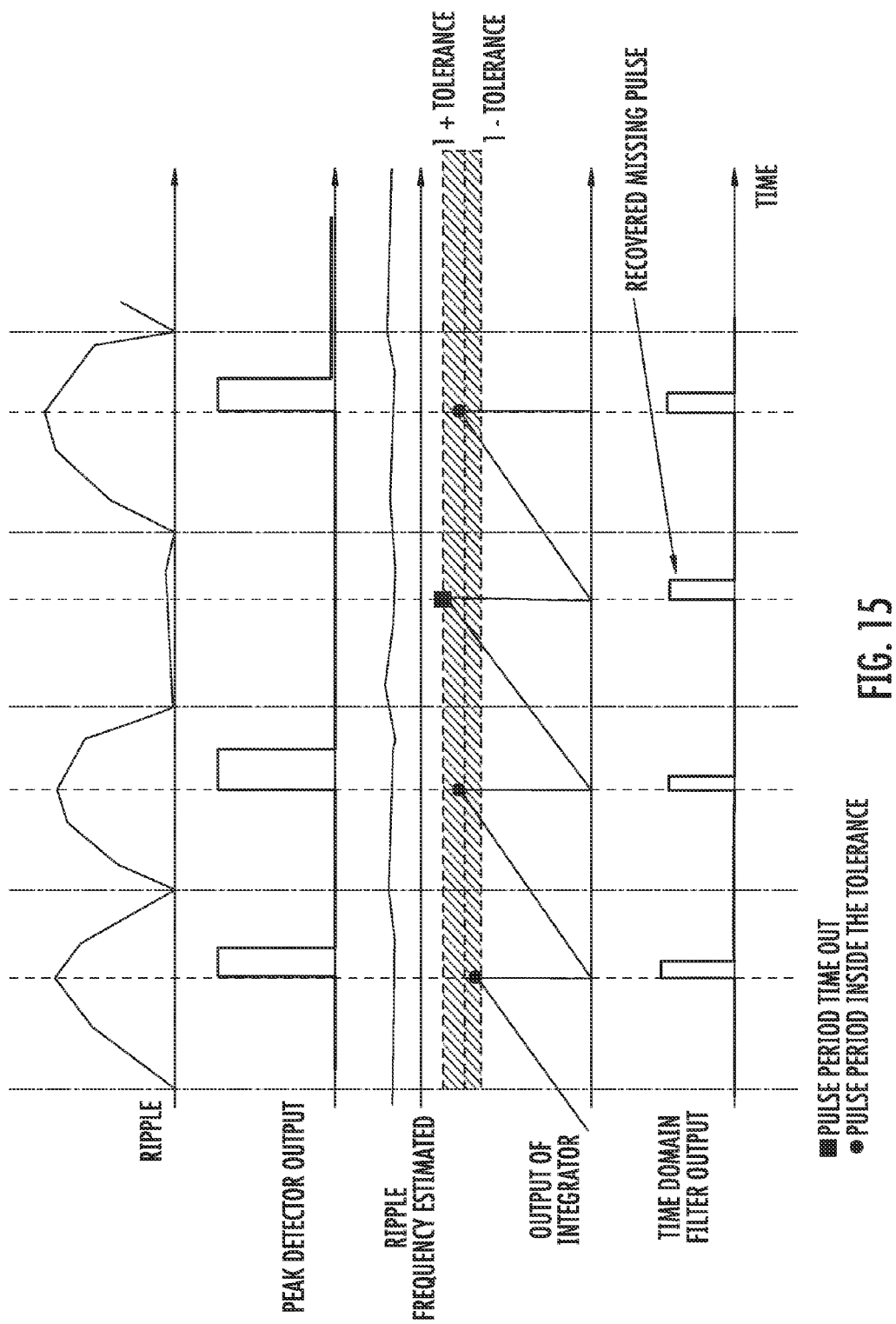
FIG. 15 is a graphical representation of the way in which the filter in the time domain recovers eventual missing peaks in the armature current signal, according to the present invention.

FIG. 15 is a graph of the way in which the filter in the time domain recovers eventual missing peaks in the armature current signal, as discussed above.

Figure 16:
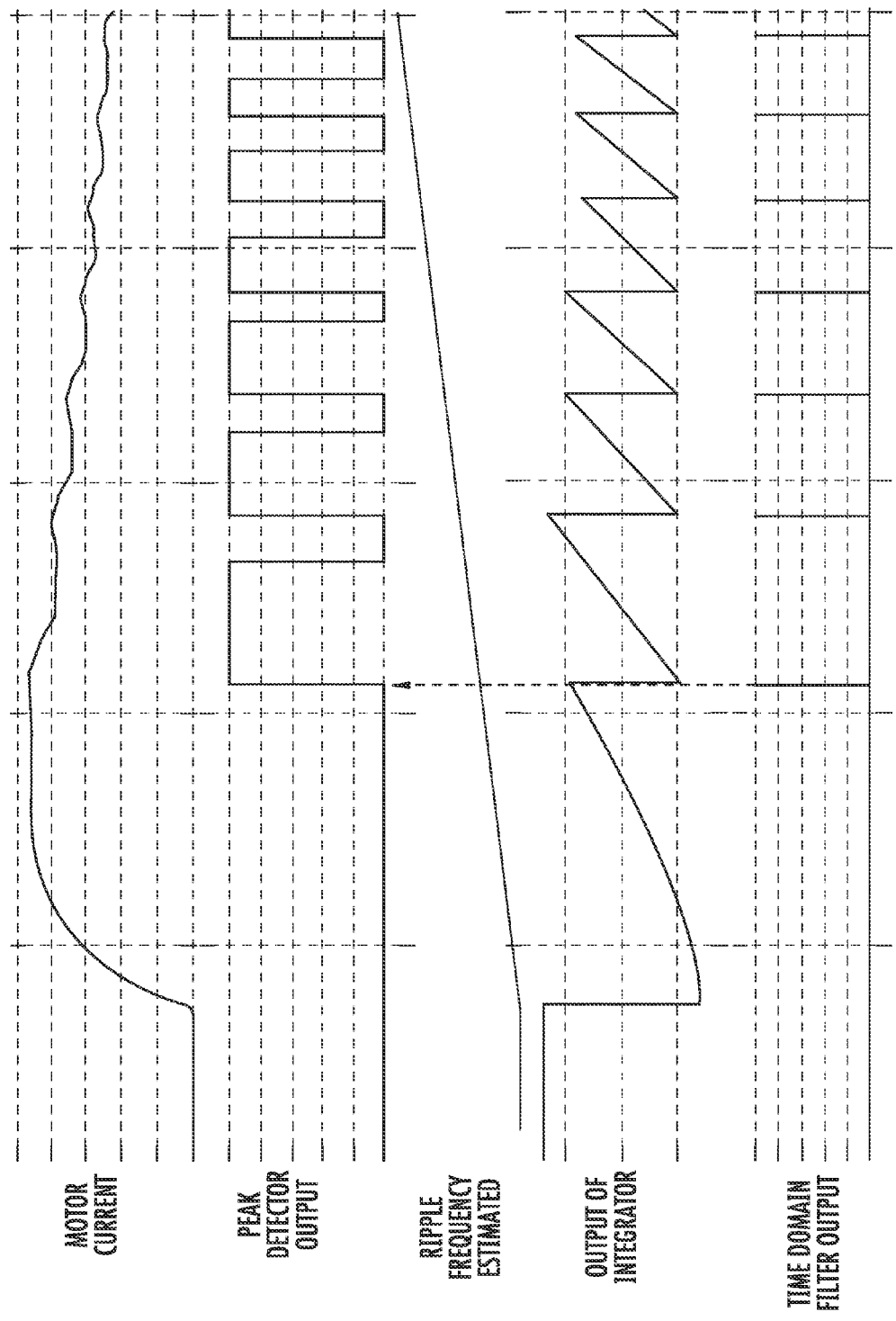
FIG. 16 is a matlab simulation of the ability of the filter of restoring missing peaks during switching of the relays while the motor is decelerating, according to the present invention.

FIG. 16 is a matlab simulation of the ability of the filter of restoring missing peaks during switching of the relays while the motor is decelerating.

Figure 17:
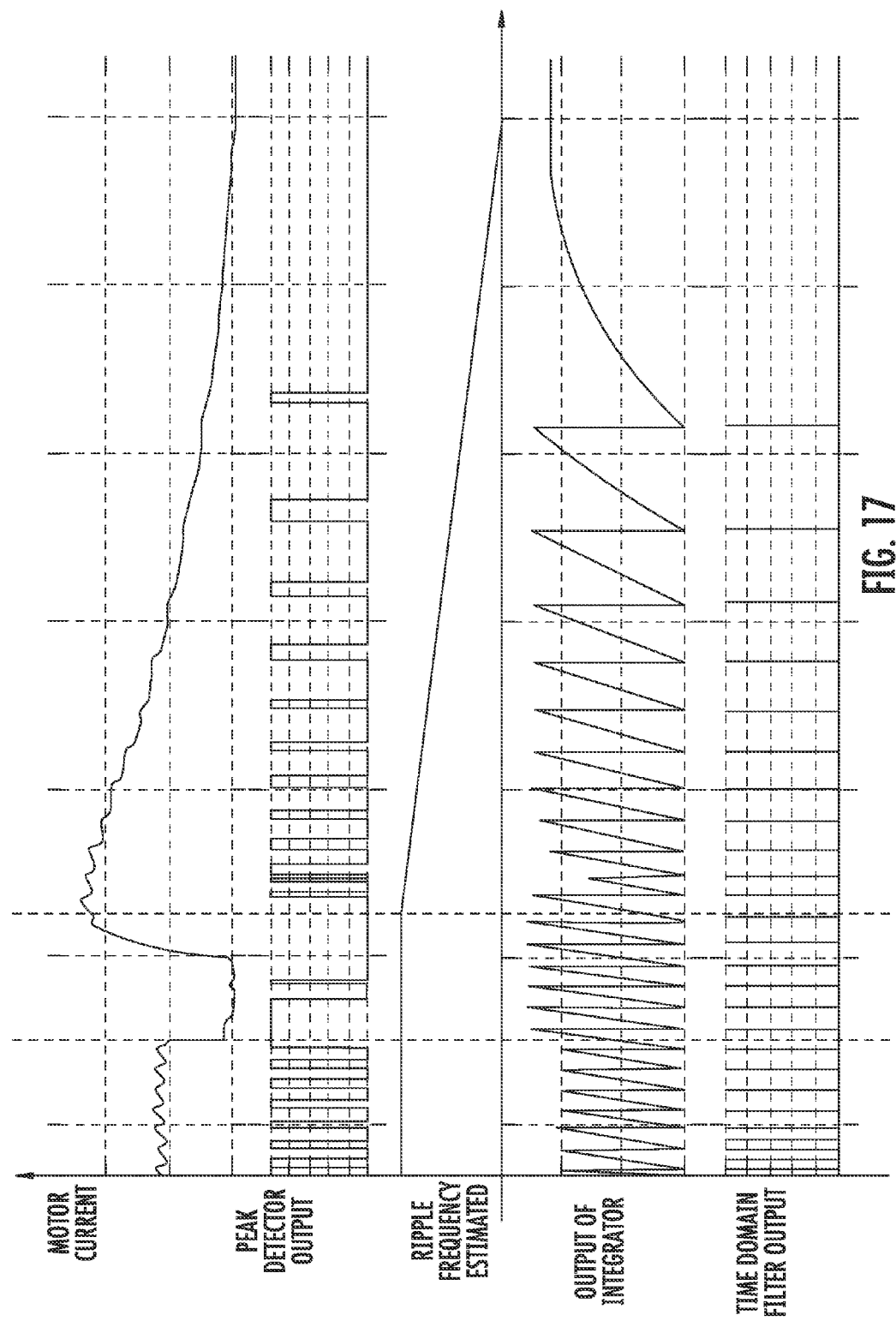
FIG. 17 and FIG. 18 are matlab simulations during a control phase of the value of the intermediate position with motor stopped and during a control phase of the initial integration value when the motor is restarted, according to the present invention.
Figure 18:
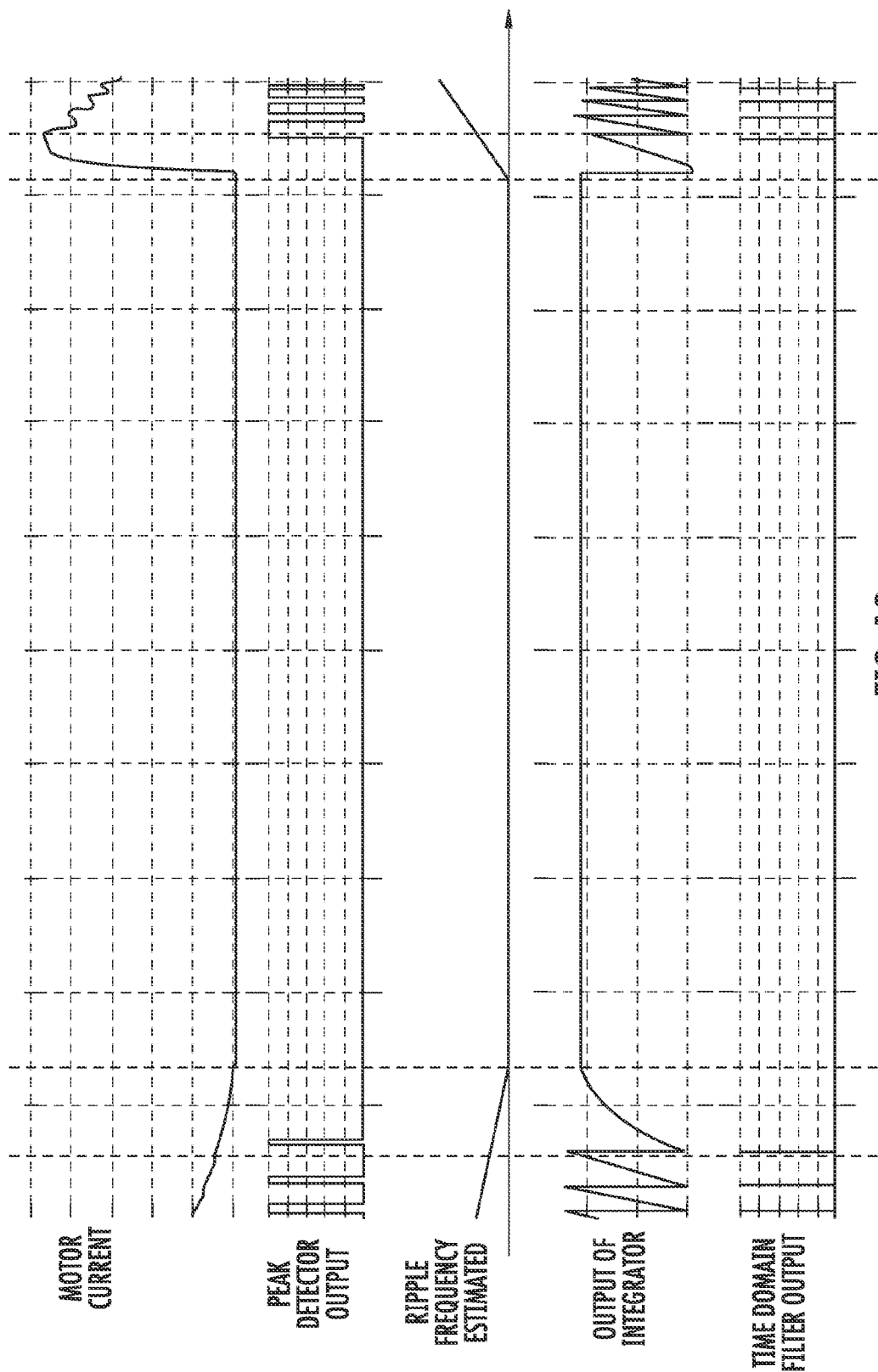

FIG. 17 and FIG. 18 are matlab simulations during a control phase of the value of the intermediate position with motor stopped and during a control phase of the initial integration value when the motor is restarted.

Figure 19:
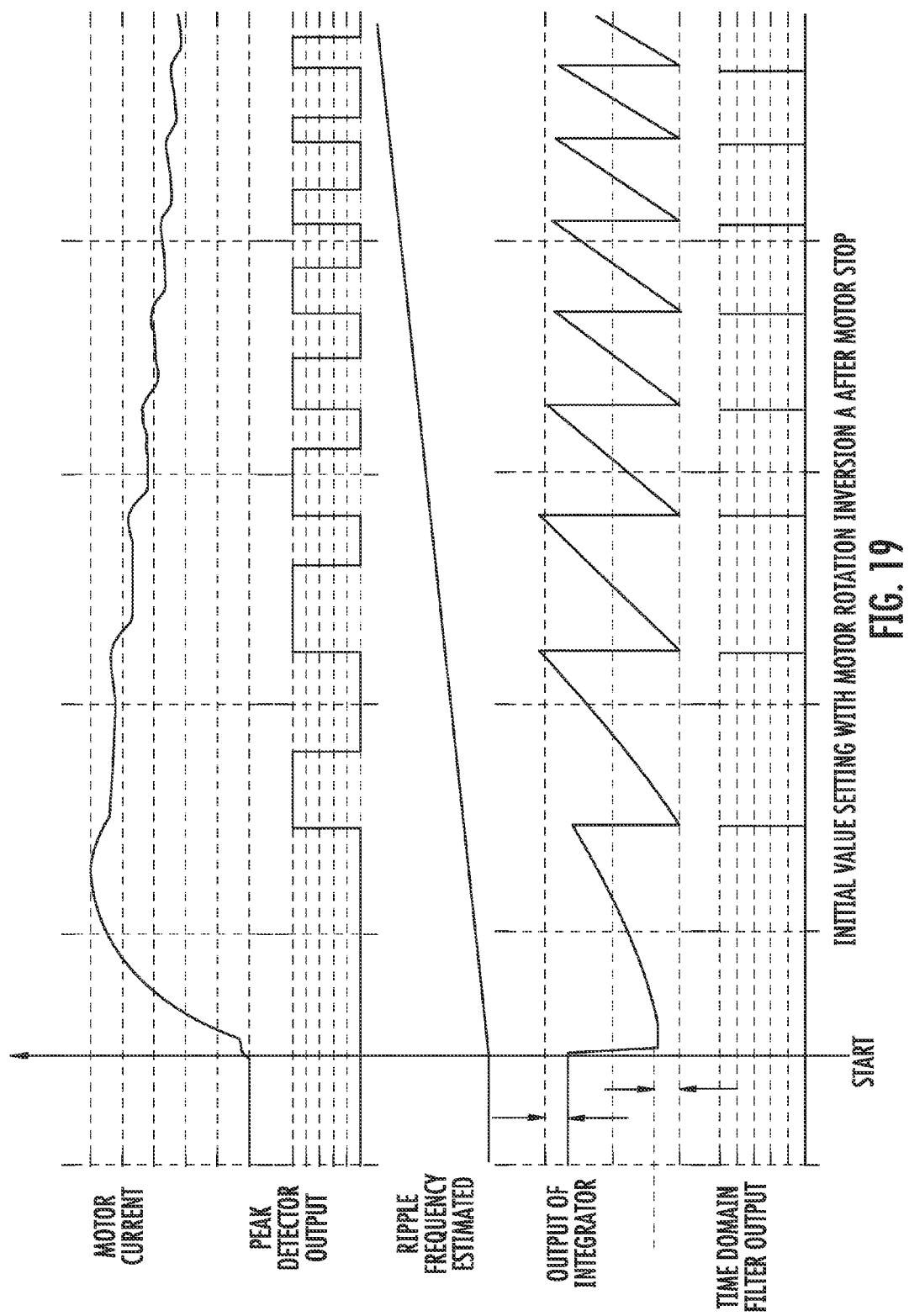
FIG. 19 is a matlab simulation that shows how the system is capable of adjusting the estimation parameters of the ripple frequency such to obtain a more refined tuning of the filter, according to the present invention.

FIG. 19 is a matlab simulation that shows how the system is capable of adjusting the estimation parameters of the ripple frequency such to obtain a more refined tuning of the filter. The simulation has been carried out during a re-acceleration in the opposite direction of the motor after having been stopped, which is the worst test condition.

Figure 20:
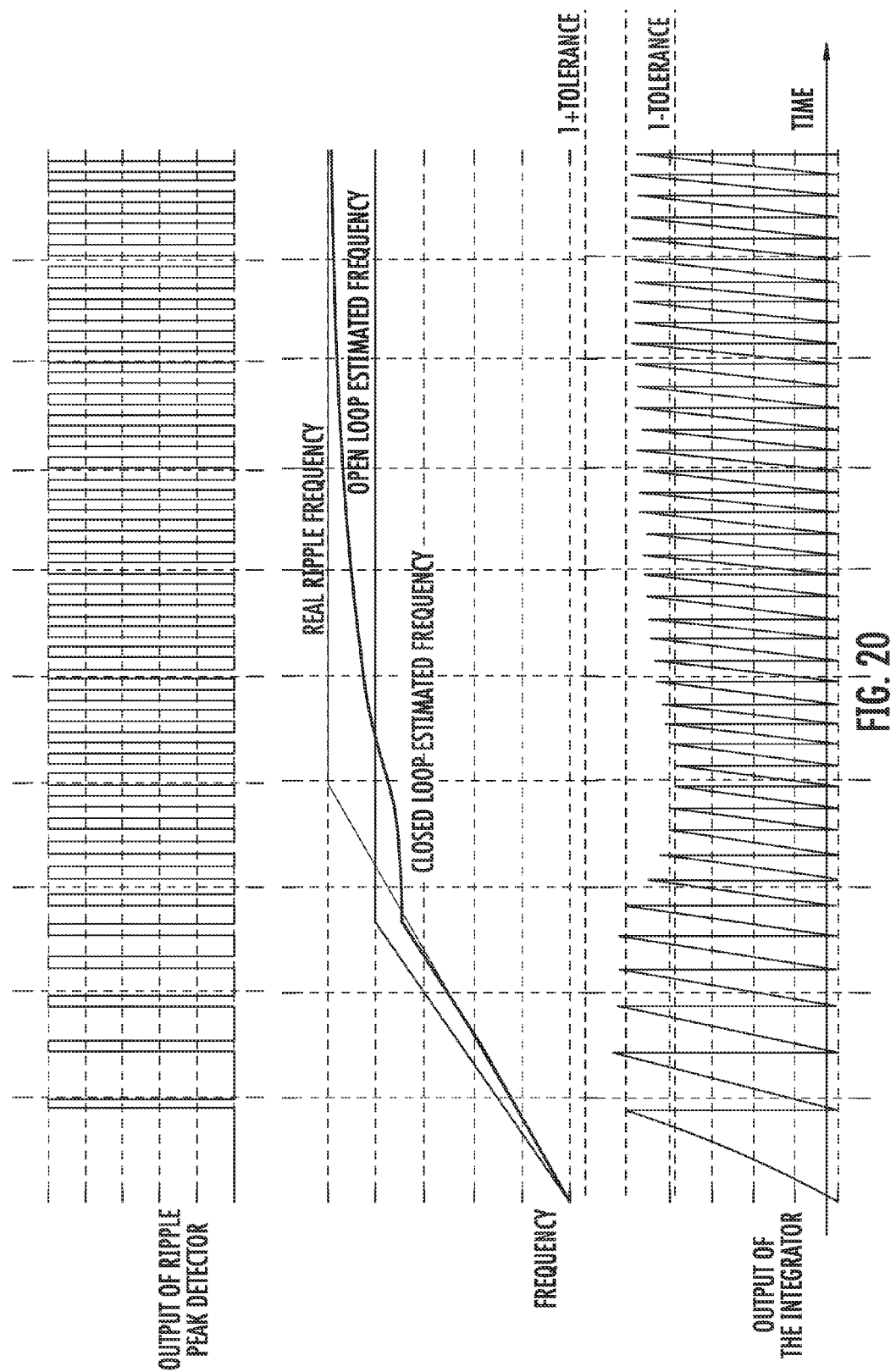
FIG. 20 is a matlab simulation that shows the self-tuning behavior of the filter during a transient.

FIG. 20 is a matlab simulation that shows the self-tuning behavior of the filter during a transient.

In the embodiments so far disclosed, the filter in the time domain does not contemplate the case in which more pulses occur in the time interval in which the value attained by the integrator (amplitude of the ramp) is within the tolerance range and thus inside the validation time window. According to the embodiments so far illustrated, the first pulse captured in the time window is considered valid, even if successive pulses could occur not only inside the discrimination time window, but also for values of the integral closer to unit value (that correspond to the current estimated time, eventually pre-conditioned, of the ripple period).

According to an alternative embodiment of the method, the system records the value of the integral in correspondence of the leading edge of each pulse falling inside the validation time window and chooses the raise time of the pulse to which corresponds the integration value closer to one.

The digital recording and processing circuitry should be adapted to the improved functions of such an alternative embodiment of the method of the invention. The execution of the above described method for choosing the "best" pulse uses a memory device, and thus a microprocessor system may be used.

Figure 21:
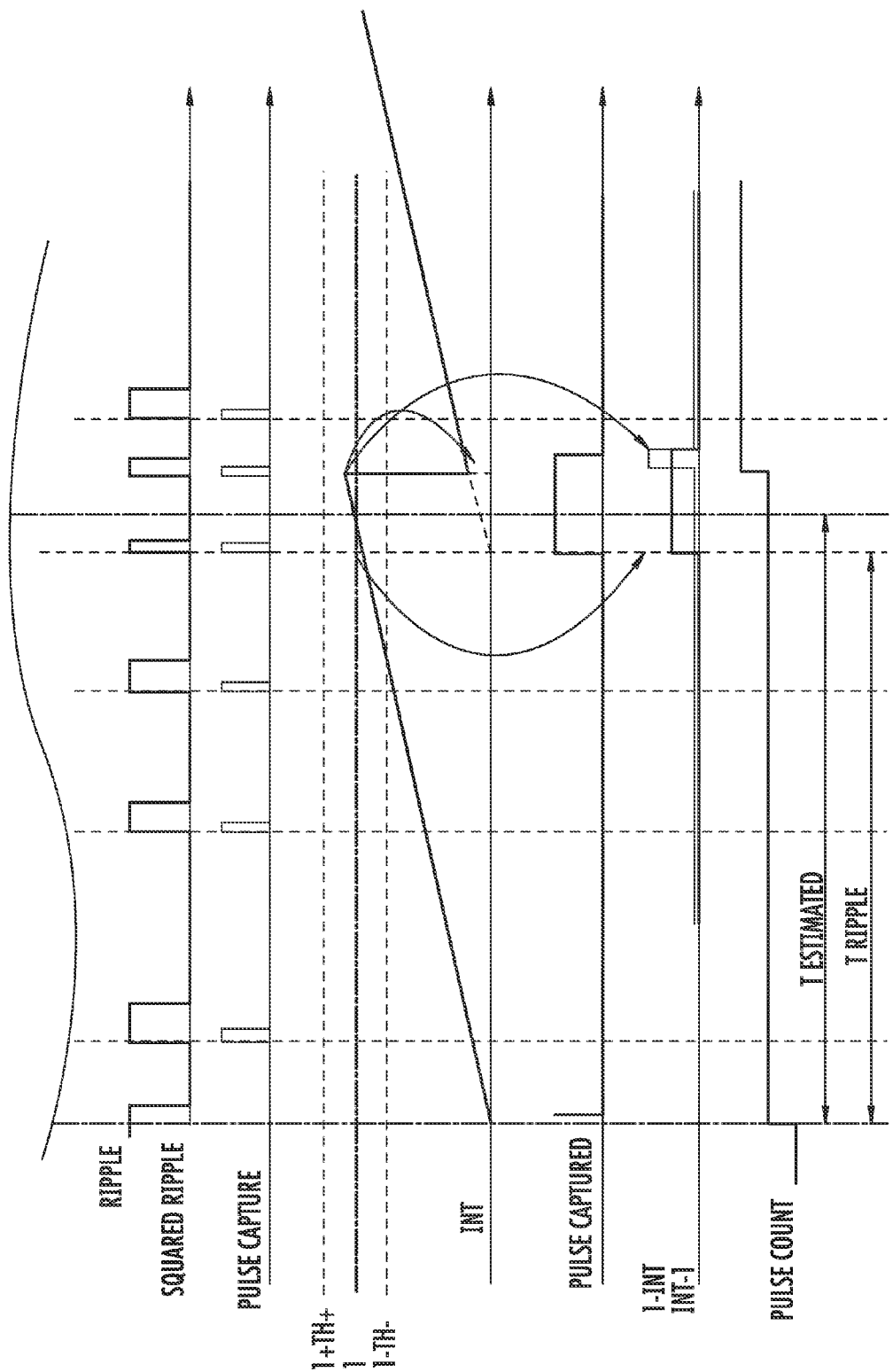
FIG. 21 is a graphical explanation of how the best leading edge is chosen when the first most valid leading edge takes place with an integration value smaller than unity, according to the present invention.

FIG. 21 is a graphical explanation of how the best leading edge is chosen when the first most valid leading edge takes place with an integration value smaller than unity.

Figure 22:
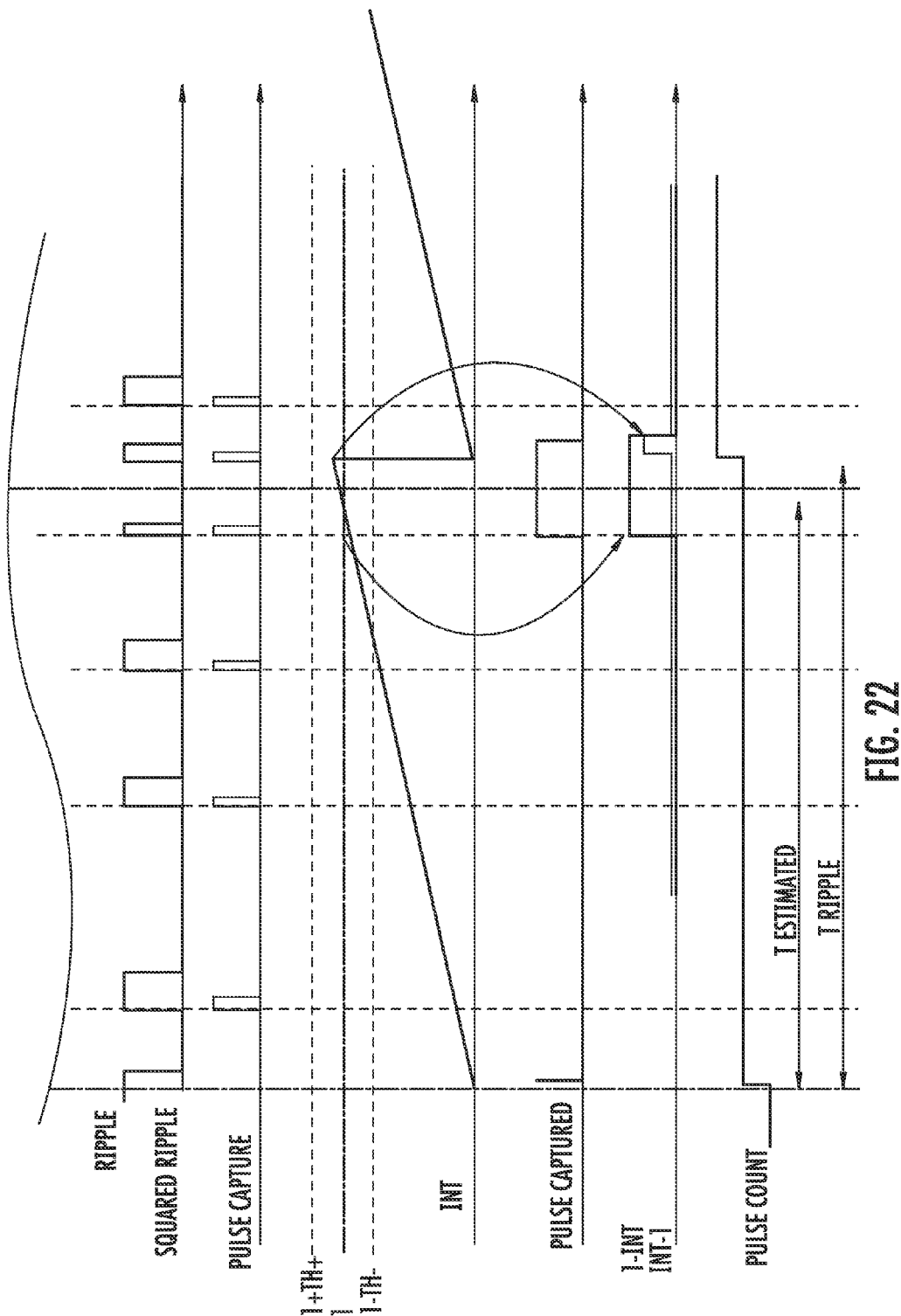
FIG. 22 is a graphical explanation of how the system chooses the best leading edge among more pulses falling inside the time window.

FIG. 22 is a graphical explanation of how the system chooses the best leading edge among more pulses falling inside the time window when the integration value in correspondence of the leading edge of the first validated pulse is smaller than one, while the best pulse occurs when the integration value is larger than one.

Figure 23:
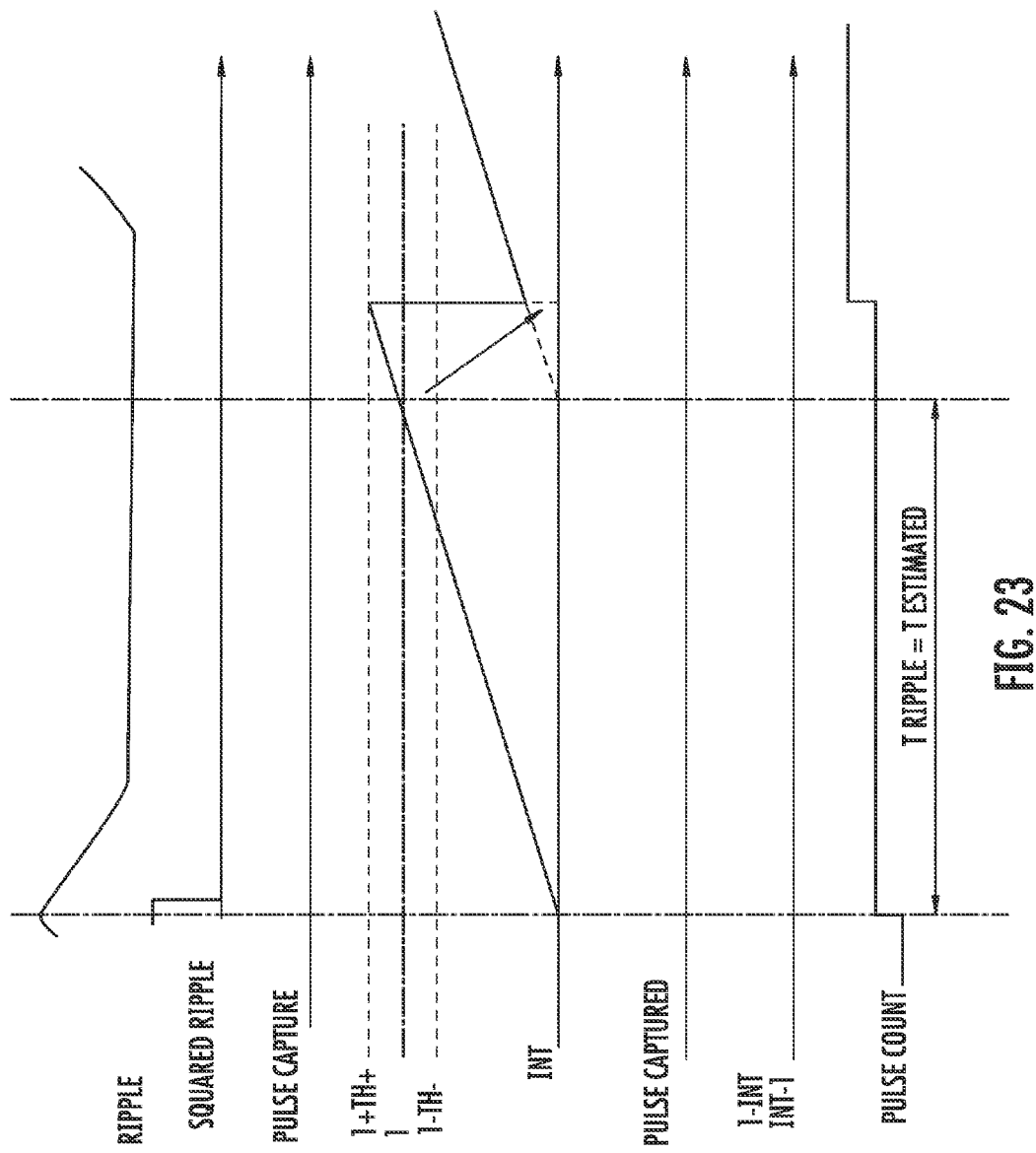
FIG. 23 illustrates graphically the behavior of the filter when no pulse is detected in the interval in which the value of the integral is within the tolerance range, according to the present invention.

FIG. 23 illustrates graphically the behavior of the filter when no pulse is detected in the time interval in which the value of the integral is within the tolerance range. In this case the system adds a pulse and resets the initial value of the integral to the value of the difference between the current value attained by the integral minus 1. Thereafter, it increases the error counter and, if the counter surpasses the pre-established maximum value, it flags a synchronization problem of the filter.

Figure 24:
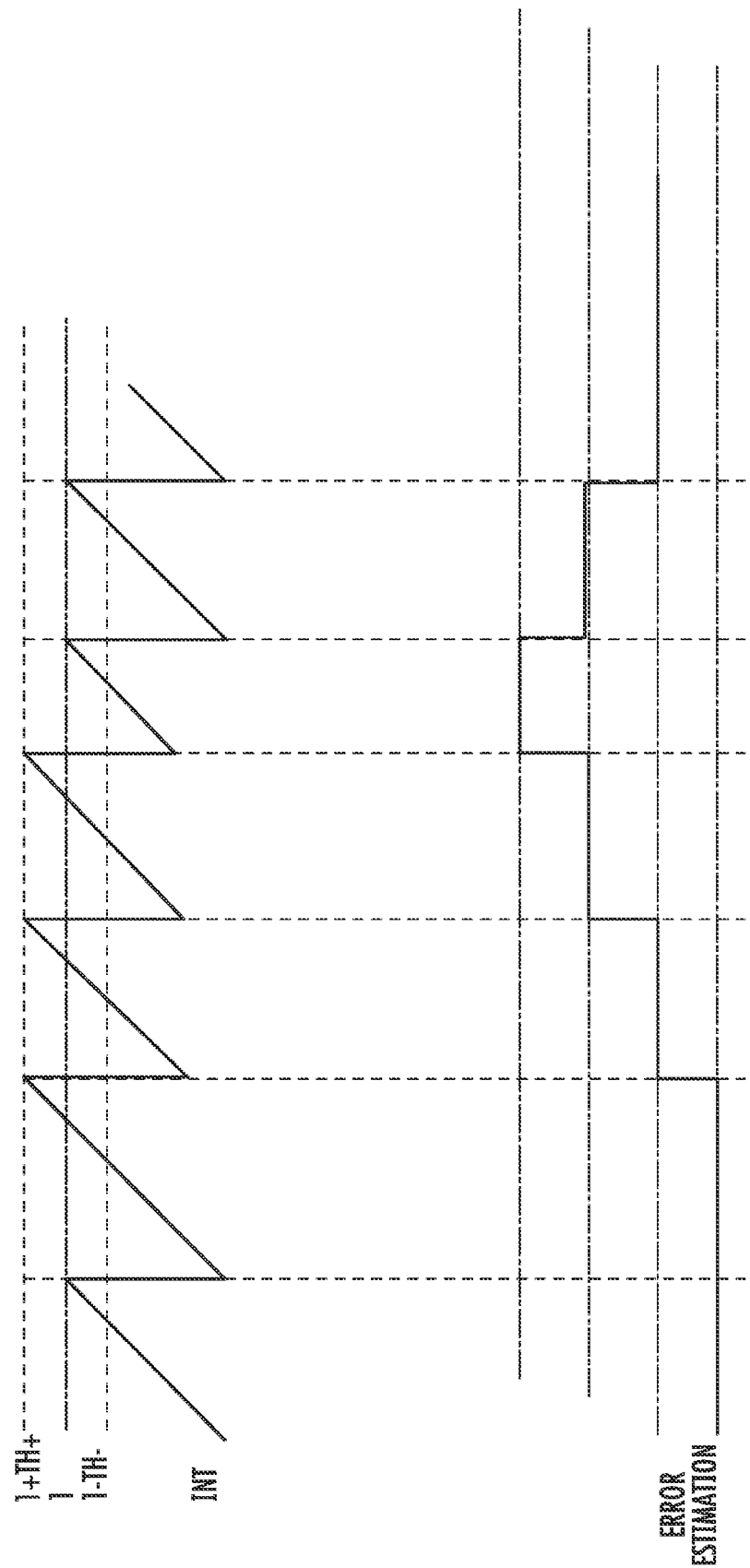
FIG. 24 shows the increase of the error estimation, according to the present invention.

As shown in FIG. 24, time out events as the one shown in FIG. 23 increase the error estimation. The error estimation decreases down to zero when a pulse is captured in the validation time window. The error estimation value may be used according to experience with the particular application because it is evident that numerous time-out events in succession are a clear evidence that the counter of the ripple peaks is out of control.

Figure 25:
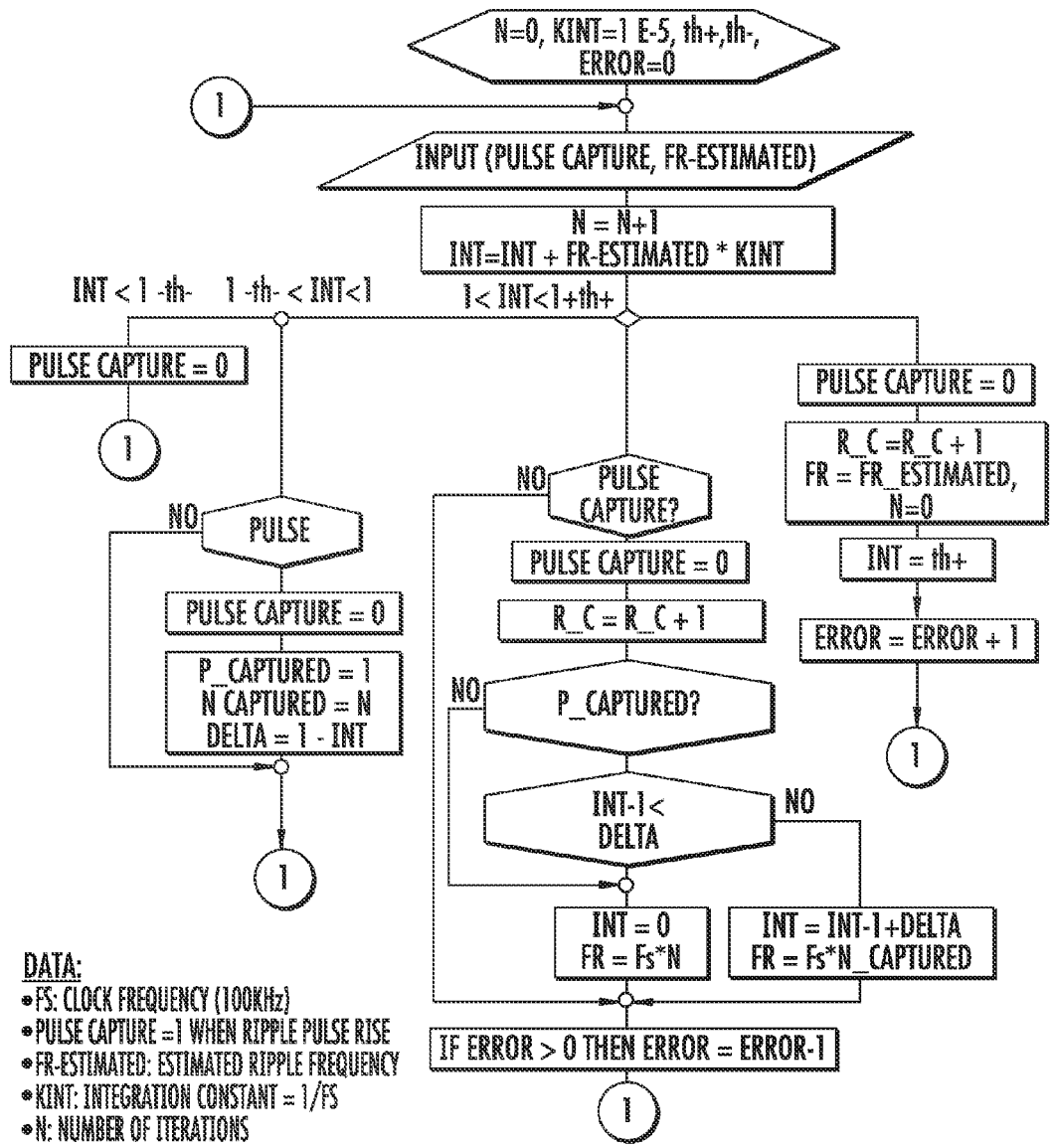
FIG. 25 is a flow chart of the control digital structure of a filtering function in the time domain, according to an embodiment capable of choosing the "best" pulse among more pulses captured in the time window, according to the present invention.

FIG. 25 is a flow chart of the control digital structure of a filtering function in the time domain, according to an embodiment capable of choosing the "best" pulse (that is the pulse that best approximates the final instant of the estimated ripple period) when more leading edges occur in the validation time window, and of flagging when a certain maximum number of errors has been surpassed.

Figure 26:
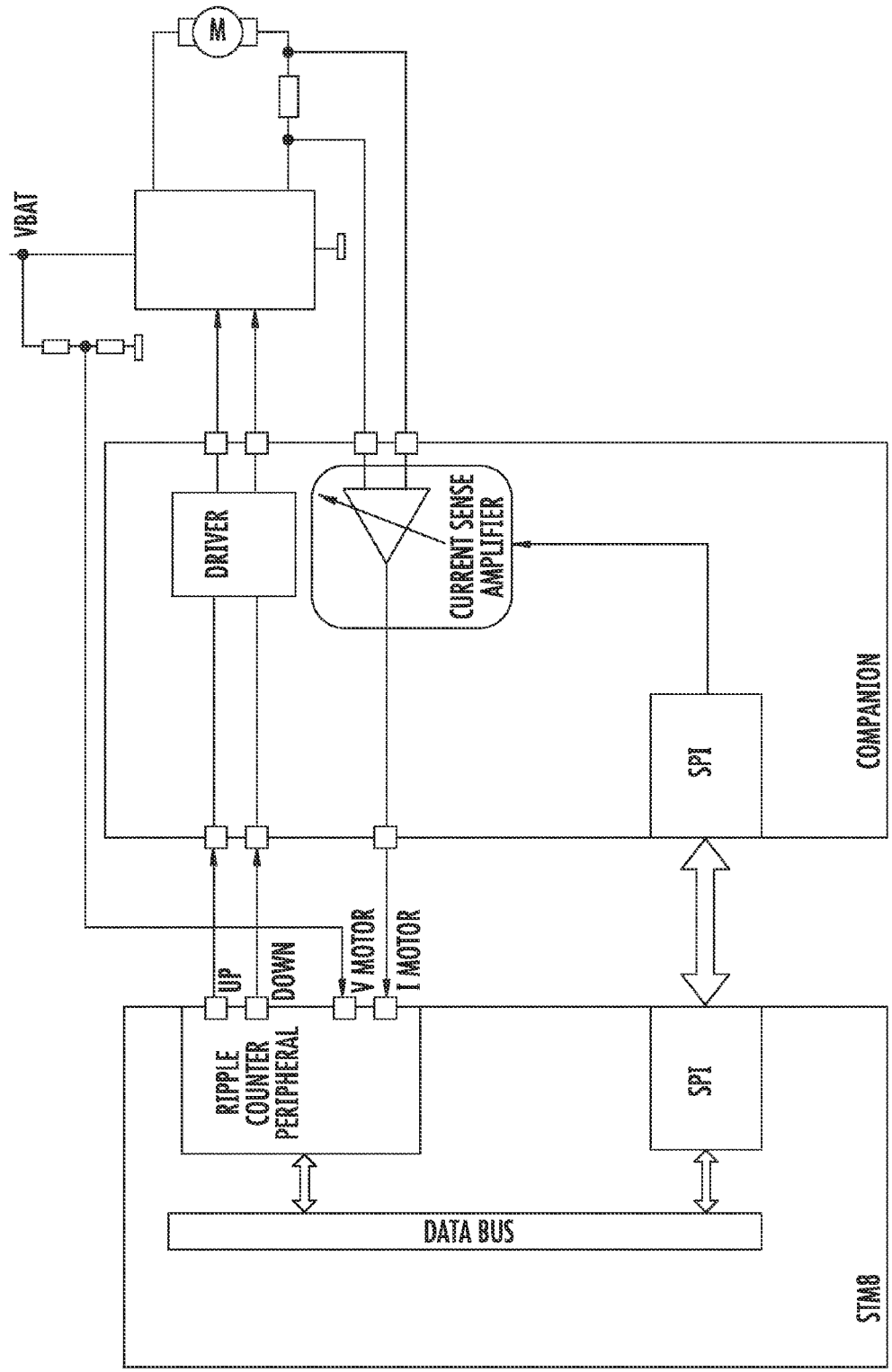
FIG. 26 depicts a possible implementing architecture subdivided into an analog device and a microprocessor digital device, that requires a minimum number of analog components, according to the present invention.

FIG. 26 depicts a possible implementing architecture subdivided into an analog device COMPANION and a microprocessor digital device STM8 containing the digital peripherals for executing the method of detecting and of controlling the angular position and/or the speed of the rotor. With this approach, the used external analog components may be the ones that are strictly necessary. In the example, there is a current sensor and an amplifier for making the signal compatible to AD conversion. This exemplary configuration would use a 10 bit AD with a sampling frequency of at least 10 kHz.

Figure 27:
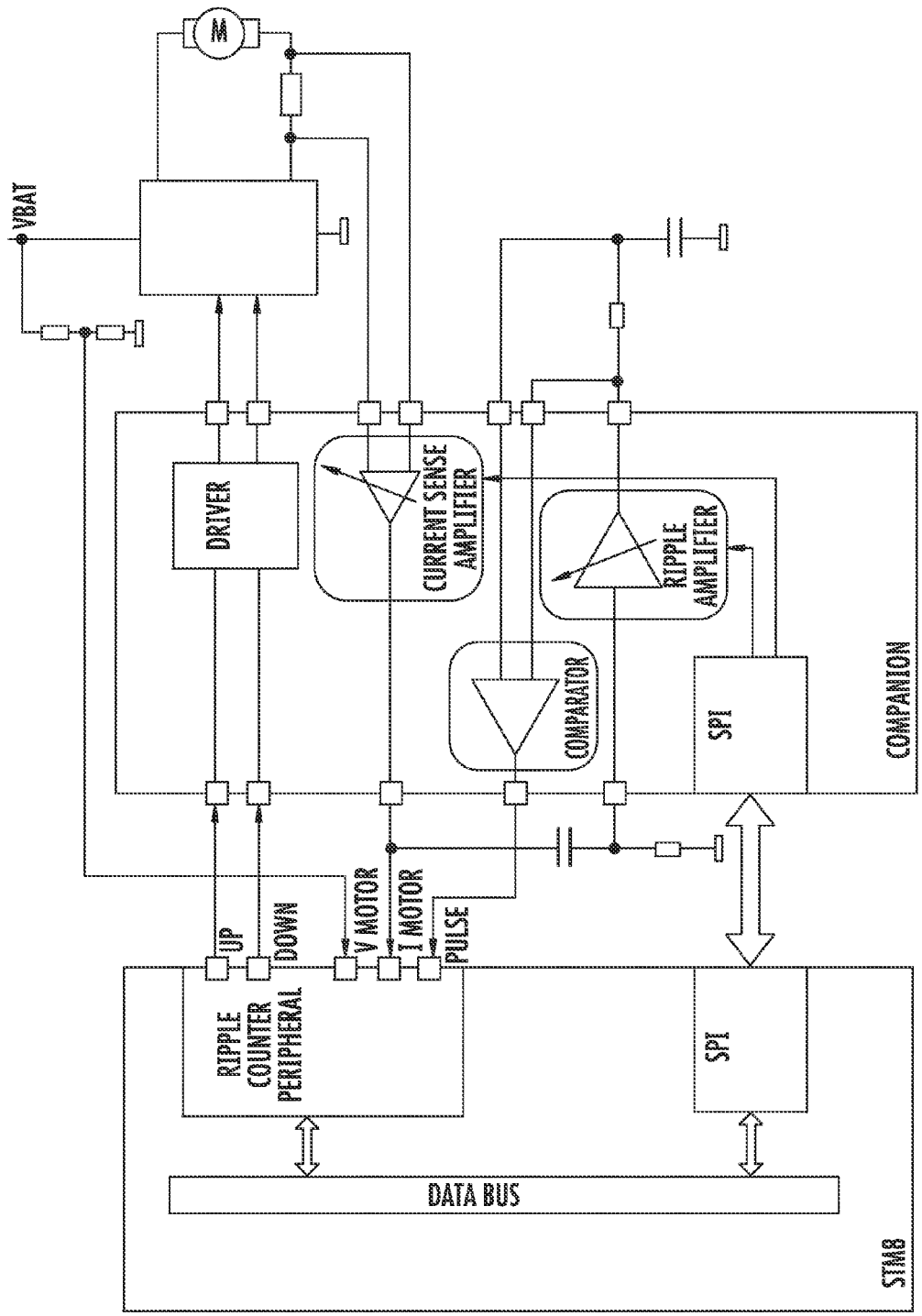
FIG. 27 is an alternative architecture subdivided into an analog device and a digital device wherein the microprocessor must only detects the presence of peaks according to the present invention.

FIG. 27 is an alternative architecture subdivided into an analog device and a digital device. The square wave with leading edges coincident with ripple peaks is obtained through an analog circuit. The microprocessor has the function of detecting the presence of peaks. In this way it is possible to use a single 8 bit AD conversion for the DC, with substantial reduction of the burden on the micro. It is thus possible to use a less powerful microprocessor, but the approach is less preferred because of the relatively large number of external passive and analog components.

FIG. 28 is yet another possible architecture subdivided into the analog device COMPANION and the digital device STM8. The ripple is separated from the DC component and is amplified at an amplitude compatible to AD conversion. In so doing, it is possible to use 8 bit converters without losing resolution on the AC signal, that is less than two orders of magnitude than the DC component. By contrast, it is helpful to implement two AD conversions: one for the DC component, with a relatively low sampling frequency, and the other for the ripple, though at a sampling frequency (for example 10 kHz) compatible with the ripple frequency.

That which is claimed:

1. A method of detecting an angular position of a rotor of a motor comprising:
    detecting at least one of switching ripple peaks and armature current disturbance peaks using a peak detector configured to generate a square wave having edges coinciding with detected peaks; and
    filtering the square wave in a time domain by at least
        generating an integration ramp, toward a set value, of an estimated ripple frequency for an interval of time based on the estimated ripple frequency,
        establishing an enablement range to reset the integration ramp by setting a threshold below and above the set value and a time window centered on an end time of each period of the estimated ripple frequency,
        resetting the integration ramp, and updating the estimated ripple frequency based upon a period determined by a time of the resetting, if an edge of the square wave is within the time window, to thereby validate the edge, and
        integrating until the threshold is exceeded, resetting the integration ramp, and reducing the estimated ripple frequency to a period determined by the resetting, if the edge of the square wave is not within the time window.

2. The method according to claim 1, wherein, at a stop of the motor, an angular position of the rotor between the switching ripple peaks and the armature current disturbance peaks is determined by comparing a final amplitude reached by the integration ramp to an amplitude at the end of the period corresponding to the estimated ripple frequency.

3. The method according to claim 2, wherein, at each start-up of the motor, integration is started from a final amplitude reached by the integration ramp.

4. The method according to claim 1, wherein integration is continued for detecting an eventual successive edge that is closer, when a first edge falls within a first semi-interval of the time window, to a terminal instant of the period of the estimated ripple frequency than a first validated edge, and resetting the integration ramp and updating the estimated ripple frequency.

5. The method according to claim 1, wherein the motor is devoid of a position sensor.

6. A method of detecting an angular position of a rotor of a motor comprising:
   detecting at least one of switching ripple peaks and armature current disturbance peaks using a peak detector configured to generate a square wave having edges coinciding with detected peaks; and
   filtering the square wave in a time domain by at least
      generating an integration ramp, toward a set value, of an estimated ripple frequency for an interval of time based on the estimated ripple frequency,
      establishing an enablement range to reset the integration ramp by setting a threshold below and above the set value and a time window centered on an end time of each period of the estimated ripple frequency,
      resetting the integration ramp, and updating the estimated ripple frequency based upon a period determined by a time of the resetting, if an edge of the square wave is within the time window, to thereby validate the edge,
      integrating until the threshold is exceeded, resetting the integration ramp, and reducing the estimated ripple frequency to a period determined by the resetting, if the edge of the square wave is not within the time window,
      the integration being continued for detecting an eventual successive edge that is closer, when a first edge falls within a first semi-interval of the time window, to a terminal instant of the period of the estimated ripple frequency than a first validated edge, and resetting the integration ramp and updating the estimated ripple frequency,
      determining an angular position of the rotor between the switching ripple peaks and the armature current disturbance peaks at a stop of the motor by comparing a final amplitude reached by the integration ramp to an amplitude at the end of the period corresponding to the estimated ripple frequency.

7. The method according to claim 5, wherein, at each start-up of the motor, integration is started from a final amplitude reached by the integration ramp.

8. A system for controlling a motor based upon an angular position of a rotor of the motor, the system comprising:
   a processor configured for detecting at least one of switching ripple peaks and armature current disturbance peaks and generating a square wave having edges coinciding with detected peaks;
   the processor also configured for filtering the square wave in a time domain by at least
      generating an integration ramp, toward a set value, of an estimated ripple frequency for an interval of time based on the estimated ripple frequency,
      establishing an enablement range to reset the integration ramp by setting a threshold below and above the set value and a time window centered on an end time of each period of the estimated ripple frequency,
      resetting the integration ramp, and updating the estimated ripple frequency based upon a period determined by a time of the resetting, if an edge of the square wave is within the time window, to thereby validate the edge, and
      integrating until the threshold is exceeded, resetting the integration ramp, and reducing the estimated ripple frequency to a period determined by the resetting, if the edge of the square wave is not within the time window.

9. The system according to claim 8 further comprising a sense element crossed by an armature current of the motor.

10. The system according to claim 9 further comprising an amplifier to amplify a current sense signal present across terminal nodes of the sense element.

11. The system according to claim 10 wherein the processor includes a first analog-to-digital (AD) converter to receive the current sense signal; and wherein the processor detects the switching ripple peaks and the armature current disturbance peaks based upon the current sense signal.

12. The system according to claim 11, further comprising an analog peak detector configured for generating a square wave with edges corresponding to detected armature current disturbance peaks and coupled to the processor.

13. The system according to claim 12, further comprising:
   an analog filter configured for separating a switching ripple component from a DC component of the amplified sense signal of the armature current;
   an analog amplifier to amplify the switching ripple component;
   the processor including a second analog-to-digital (AD) converter configured for converting the amplified switching ripple signal at a first sampling frequency and a third AD converter configured for converting the DC component at a second sampling frequency less than the first sampling frequency.

14. The system according to claim 8, wherein the motor is devoid of a position sensor.

15. A system for controlling a motor based upon an angular position of a rotor of the motor, the motor being devoid of a position sensor, the system comprising:
   a sense element crossed by an armature current of the motor;
   an amplifier to amplify a current sense signal present across terminal nodes of the sense element; and
   a processor including a first analog-to-digital (AD) converter to receive the current sense signal and configured for detecting at least one of switching ripple peaks and armature current disturbance peaks and generating a square wave having edges coinciding with detected peaks based upon the current sense signal;
   the processor also configured for filtering the square wave in a time domain by at least
      generating an integration ramp, toward a set value, of an estimated ripple frequency for an interval of time based on the estimated ripple frequency,
      establishing an enablement range to reset the integration ramp by setting a threshold below and above the set value and a time window centered on an end time of each period of the estimated ripple frequency,
      resetting the integration ramp, and updating the estimated ripple frequency based upon a period determined by a time of the resetting, if an edge of the square wave is within the time window, to thereby validate the edge, and
      integrating until the threshold is exceeded, resetting the integration ramp, and reducing the estimated ripple frequency to a period determined by the resetting, if the edge of the square wave is not within the time window.

16. The system according to claim 15, further comprising an analog peak detector configured for generating a square wave with edges corresponding to detected armature current disturbance peaks and coupled to the processor.

17. The system according to claim 16, further comprising:
an analog filter configured for separating a switching ripple component from a DC component of the amplified sense signal of the armature current; and an analog amplifier to amplify the switching ripple component;
the processor including a second analog-to-digital (AD) converter configured for converting the amplified switching ripple signal at a first sampling frequency and a third AD converter configured for converting the DC component at a second sampling frequency less than the first sampling frequency.

* * * * *

UNITED STATES PATENT AND TRADEMARK OFFICE
CERTIFICATE OF CORRECTION

PATENT NO.        : 8,169,178 B2
APPLICATION NO.   : 12/648790
DATED             : May 1, 2012
INVENTOR(S)       : Letor et al.

Page 1 of 1

It is certified that error appears in the above-identified patent and that said Letters Patent is hereby corrected as shown below:

In the Claims:

Column 9, Line 48          Delete: "claim 5, wherein,"
                           Insert: --claim 6, wherein,--

Signed and Sealed this
Twenty-eighth Day of May, 2013

Teresa Stanek Rea
*Acting Director of the United States Patent and Trademark Office*